United States Patent
Ilyes

(10) Patent No.: US 8,864,514 B2
(45) Date of Patent: *Oct. 21, 2014

(54) CONTROLLER DEVICE

(75) Inventor: Laszlo Sandor Ilyes, Richmond Heights, OH (US)

(73) Assignee: General Electric Company, Schenectady, NY (US)

( * ) Notice: Subject to any disclaimer, the term of this patent is extended or adjusted under 35 U.S.C. 154(b) by 77 days.

This patent is subject to a terminal disclaimer.

(21) Appl. No.: 13/588,492

(22) Filed: Aug. 17, 2012

(65) Prior Publication Data

US 2013/0210252 A1     Aug. 15, 2013

Related U.S. Application Data

(63) Continuation-in-part of application No. 13/212,712, filed on Aug. 18, 2011, and a continuation-in-part of application No. 12/959,921, filed on Dec. 3, 2010, and a continuation-in-part of application No. 12/899,731, filed on Oct. 7, 2010, and a continuation-in-part of application No. 13/224,698, filed on Sep. 2, 2011, now Pat. No. 8,398,435, which is a continuation-in-part of application No. 13/101,577, filed on May 5, 2011, now Pat. No. 8,038,481.

(51) Int. Cl.
| | |
|---|---|
| *H01R 13/625* | (2006.01) |
| *G01J 1/02* | (2006.01) |
| *H05B 37/02* | (2006.01) |
| *F21V 23/04* | (2006.01) |
| *H01R 24/38* | (2011.01) |
| *H01R 33/945* | (2006.01) |
| *G01J 1/04* | (2006.01) |
| *G08C 19/00* | (2006.01) |
| *F21V 15/01* | (2006.01) |
| *F21W 131/10* | (2006.01) |

(52) U.S. Cl.
CPC .............. *H05B 37/02* (2013.01); *G01J 1/0271* (2013.01); *F21V 23/0442* (2013.01); *H01R 24/38* (2013.01); *F21W 2131/10* (2013.01); *H01R 33/945* (2013.01); *G01J 1/0403* (2013.01); *G08C 19/00* (2013.01); *F21V 15/01* (2013.01); *G01J 1/0407* (2013.01); *F21V 23/0464* (2013.01)
USPC ........................................................ 439/337

(58) Field of Classification Search
USPC ......... 439/337, 558, 669, 924.1, 334, 607.41, 439/607.5, 607.51, 607.52
See application file for complete search history.

(56) References Cited

U.S. PATENT DOCUMENTS 3,112,973 A * 12/1963 Von Holtz ..................... 439/456
3,379,892 A    4/1968 Neagle
(Continued)

FOREIGN PATENT DOCUMENTS

| DE | 8716978 | 3/1988 |
|---|---|---|
| DE | 102007057404 | 5/2009 |

(Continued)

OTHER PUBLICATIONS

International Textbook Company, International Library of Technology: Principles of Telephony, p. 34-36, 1907, United Kingdom.

(Continued)

*Primary Examiner* — Neil Abrams
*Assistant Examiner* — Phuongchi T Nguyen
(74) *Attorney, Agent, or Firm* — Pearne & Gordon LLP

(57) ABSTRACT

An electrical device includes a housing and an electrically insulating base secured to the housing. A communication terminal protrudes from the base. Electrically conductive main terminals protrude from the base and are spaced apart from each other and from the communication terminal. The main terminals are arcuate shaped and form arcs of a reference ring the center of which is a rotational axis of the electrical device. The communication terminal is disposed within the reference ring. Also featured is a controller device.

37 Claims, 18 Drawing Sheets

(56) References Cited

U.S. PATENT DOCUMENTS

| | | | |
|---|---|---|---|
| 3,745,512 A * | 7/1973 | Johnson et al. | 439/599 |
| 3,798,584 A * | 3/1974 | Person | 439/102 |
| 3,874,766 A | 4/1975 | Mizusawa | |
| 4,290,664 A * | 9/1981 | Davis et al. | 439/638 |
| 4,362,905 A * | 12/1982 | Ismail | 379/442 |
| 4,477,143 A | 10/1984 | Taylor | |
| 4,653,834 A | 3/1987 | Norden | |
| 4,691,341 A | 9/1987 | Knoble | |
| 4,740,172 A * | 4/1988 | Tubbs | 439/344 |
| 4,990,099 A * | 2/1991 | Marin et al. | 439/284 |
| 5,235,252 A | 8/1993 | Blake | |
| 5,345,366 A | 9/1994 | Cheng | |
| 5,490,790 A * | 2/1996 | Okada | 439/141 |
| 5,593,318 A | 1/1997 | Bilson et al. | |
| 5,647,751 A | 7/1997 | Shulman et al. | |
| 6,068,384 A | 5/2000 | Tyson et al. | |
| 6,119,076 A | 9/2000 | Williams | |
| 6,203,344 B1 * | 3/2001 | Ito | 439/218 |
| 6,250,967 B1 * | 6/2001 | Chu | 439/668 |
| 6,290,543 B1 * | 9/2001 | Plummer et al. | 439/639 |
| 6,328,581 B1 | 12/2001 | Lee | |
| 6,421,941 B1 | 7/2002 | Finke | |
| 6,964,586 B2 * | 11/2005 | Siddiqui | 439/669 |
| 7,016,802 B2 | 3/2006 | Flaherty | |
| 7,050,808 B2 | 5/2006 | Janusz | |
| 7,064,269 B2 * | 6/2006 | Smith | 174/50 |
| 7,123,140 B1 | 10/2006 | Denes | |
| 7,128,602 B1 * | 10/2006 | Cromwell et al. | 439/540.1 |
| 7,144,260 B2 | 12/2006 | Murayama | |
| 7,307,514 B2 | 12/2007 | McAden | |
| 7,322,702 B2 | 1/2008 | Shimizu | |
| 7,493,100 B2 | 2/2009 | Welles, II et al. | |
| 7,507,001 B2 | 3/2009 | Kit | |
| 7,548,223 B2 | 6/2009 | Brooksby et al. | |
| 7,560,677 B2 | 7/2009 | Lyons | |
| 7,622,701 B2 | 11/2009 | Stevens et al. | |
| 7,637,766 B2 | 12/2009 | Kauffman et al. | |
| 7,727,029 B2 * | 6/2010 | Bolin et al. | 439/669 |
| 7,740,501 B2 * | 6/2010 | Ballard et al. | 439/578 |
| 7,824,229 B1 * | 11/2010 | Yang et al. | 439/669 |
| 7,825,793 B1 | 11/2010 | Spillman | |
| 7,828,463 B1 | 11/2010 | Willis | |
| 7,841,903 B2 * | 11/2010 | Saito | 439/638 |
| 7,853,736 B2 * | 12/2010 | Ueno | 710/40 |
| 7,868,561 B2 | 1/2011 | Weightman | |
| 7,911,359 B2 | 3/2011 | Walters | |
| 8,038,481 B1 | 10/2011 | Creighton et al. | |
| 8,140,276 B2 | 3/2012 | Walters | |
| 8,143,568 B2 | 3/2012 | Flaherty | |
| 8,267,723 B2 * | 9/2012 | Hering et al. | 439/660 |
| 8,337,254 B2 * | 12/2012 | Jin | 439/675 |
| 8,376,592 B2 | 2/2013 | Engstrom | |
| 8,382,492 B2 * | 2/2013 | Hering et al. | 439/101 |
| 2002/0119692 A1 | 8/2002 | Burton | |
| 2004/0053528 A1 | 3/2004 | Kainz et al. | |
| 2004/0124786 A1 | 7/2004 | Morrissey, Jr. | |
| 2005/0282430 A1 | 12/2005 | Hoxha | |
| 2006/0193151 A1 | 8/2006 | Quang et al. | |
| 2007/0222581 A1 | 9/2007 | Hawkins et al. | |
| 2008/0068841 A1 | 3/2008 | Chi et al. | |
| 2008/0191897 A1 | 8/2008 | Mccollough | |
| 2009/0050785 A1 | 2/2009 | Flaherty | |
| 2009/0066258 A1 | 3/2009 | Cleland et al. | |
| 2009/0206760 A1 | 8/2009 | Flaherty | |
| 2009/0258524 A1 * | 10/2009 | McEnery | 439/334 |
| 2010/0029268 A1 | 2/2010 | Myer et al. | |
| 2010/0201267 A1 | 8/2010 | Bourquin | |
| 2010/0271178 A1 | 10/2010 | Ahmad | |
| 2011/0026231 A1 | 2/2011 | Scordino | |
| 2011/0076896 A1 | 3/2011 | Jol | |
| 2012/0086560 A1 | 4/2012 | Ilyes et al. | |
| 2012/0135645 A1 | 5/2012 | Jol | |
| 2012/0139426 A1 | 6/2012 | Ilyes et al. | |

FOREIGN PATENT DOCUMENTS

| | | |
|---|---|---|
| EP | 2149746 | 2/2010 |
| GB | 2444734 | 6/2008 |
| WO | 2004082875 A1 | 9/2004 |
| WO | 2009003279 | 1/2009 |

OTHER PUBLICATIONS

RCA Connectors sold in the U.S. at least as early as 2008.
Twist-Lock Halogen plug/receptacle sold in the U.S. in 1990.
International Search Report and Written Opinion Issued Apr. 4, 2012 in PCT Application No. PCT/US2011/048547.
International Search Report and Written Opinion Issued May 10, 2012 in PCT Application No. PCT/US2011/058234.
International Search Report and Written Opinion Issued Aug. 24, 2012 in PCT Application No. PCT/US2012/036204.
U.S. Appl. No. 13/212,712, filed Aug. 18, 2011, entitled System Assembly and Design of Photoelectric Controller Device, Inventor Jason Creighton, et al.
U.S. Appl. No. 13/224,698, filed Sep. 2, 2011, entitled Receptacle Connector Between Controller and Lighting Fixture, Inventor Deeder Aurongzeb, et al.
"EverLast Induction Lighting", EverLast Lighting, A Product of Full Spectrum Solution, Inc., Jackson, MI, 2009.
"Installation Instructions 413 Series Horizontal Luminaire", American Electric Lighting, a division of Acuity Group, Inc., Convyers, GA.
"M-250R2 Luminaire", GE Lighting Systems, Inc., 2008.
"Nema straight blade configurations", obtained from Internet 2010.
Invitation to Pay Additional Fees from corresponding PCT Appiication No. PCT/US2012/051383 dated Feb. 28, 2013.
Basf, "Snap-Fit Design Manual", pp. 1-24, Jan. 1, 2007.
PCT Invitation to Pay Additional Fees dated Oct. 16, 2013 from corresponding PCT Patent Application No. PCT/US2013/050174.
Wikipedia, Coaxial Cable, Nov. 11, 2009.
ANSI C136.10-2010 American National Standard for Roadway and Area Lighting Equipment Locking Type Photocontrol Devices and Mating Receptacles Physical and Electrical Interchangeability and Testing American National Standards Institute Inc. Aug. 2, 2010.
Invitation to Pay Additional Fees and Where Applicable, Protest Fee and Partial International Search, Jan. 12, 2012.
Office Action for U.S. Appl. No. 13/212,712 dated Oct. 3, 2013, Aug. 18, 2011.
U.S. Appl. No. 12/899,731 entitled Outdoor Lighting System, Oct. 7, 2010.
U.S. Appl. No. 12/959,921 entitled Dimmable Outdoor Luminaries, Dec. 3, 2010.

\* cited by examiner

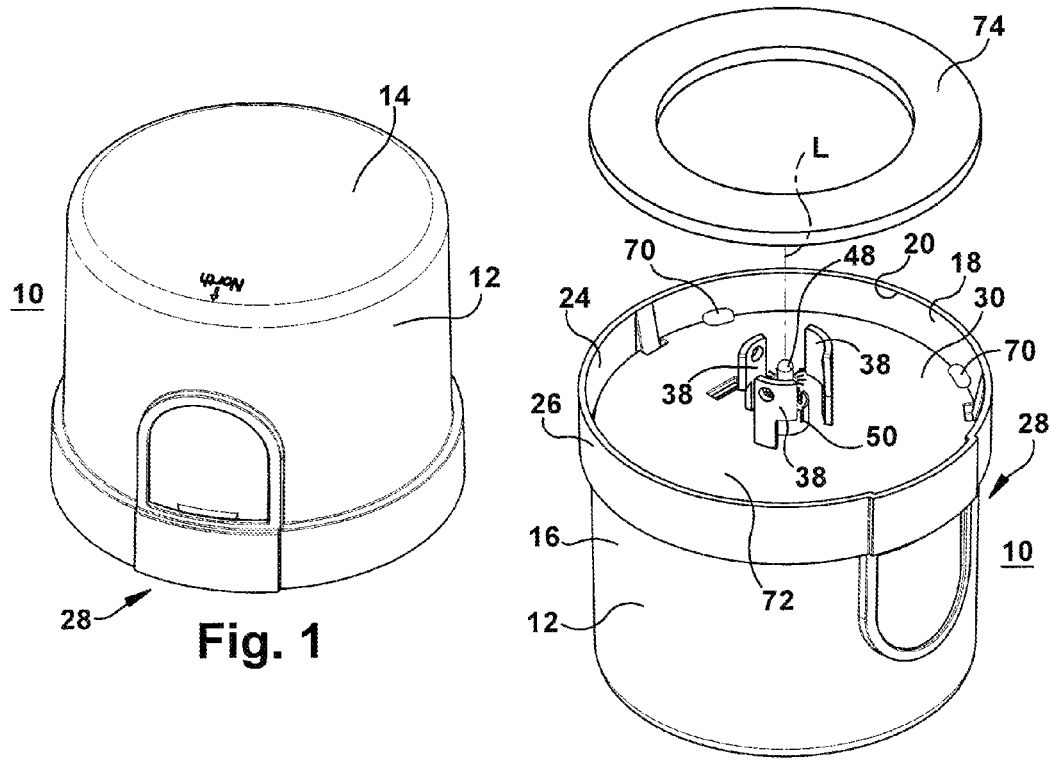
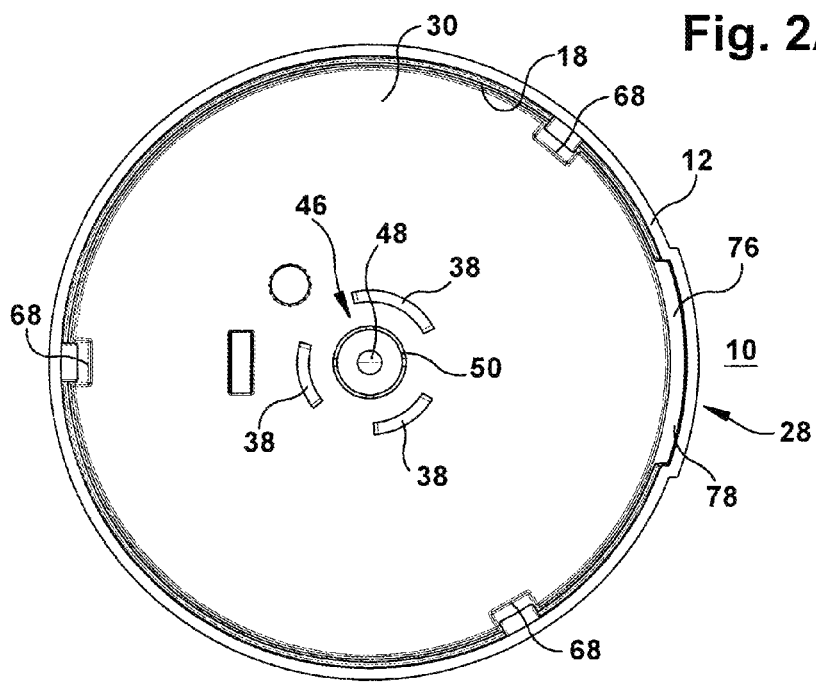

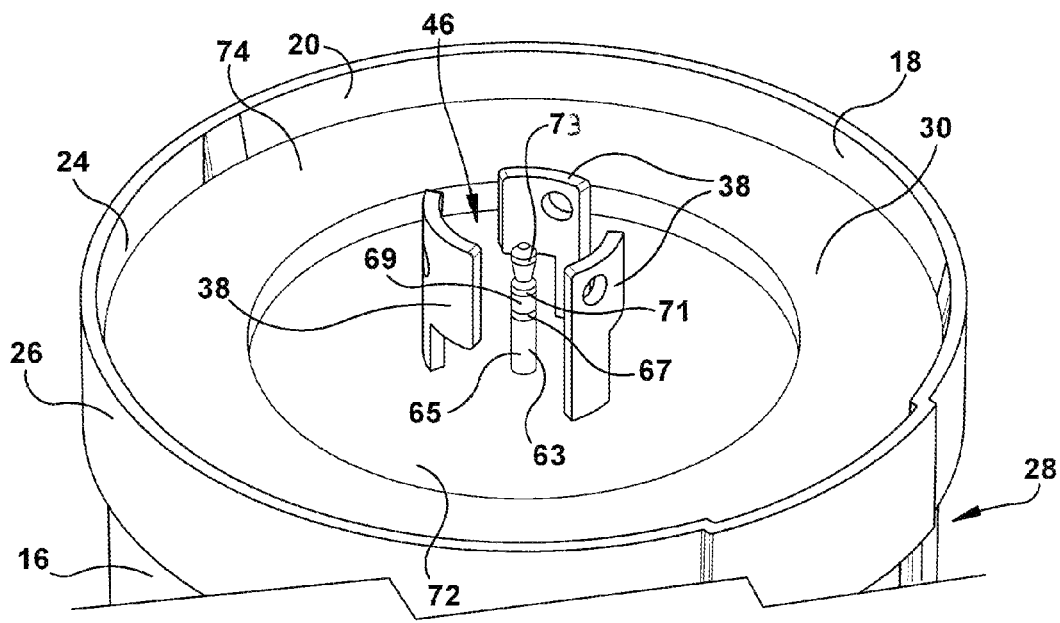
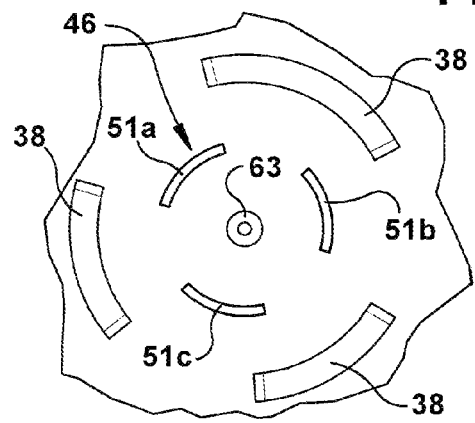
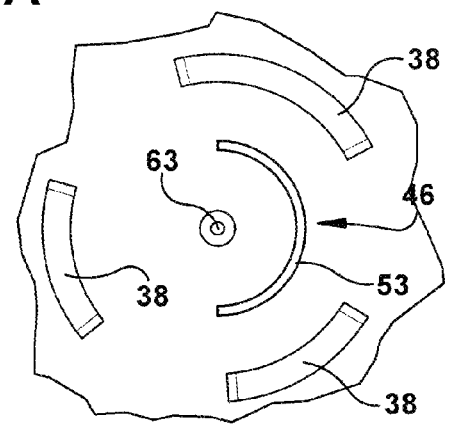
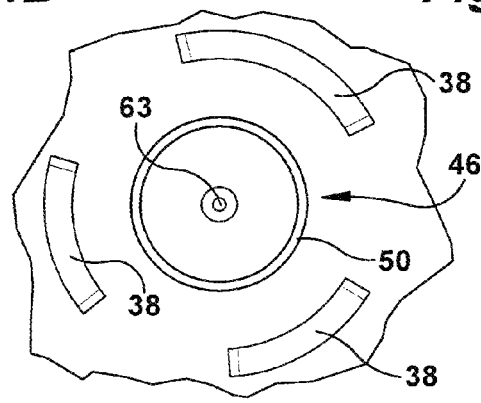
Fig. 4A
Fig. 4B     Fig. 4C
Fig. 4D

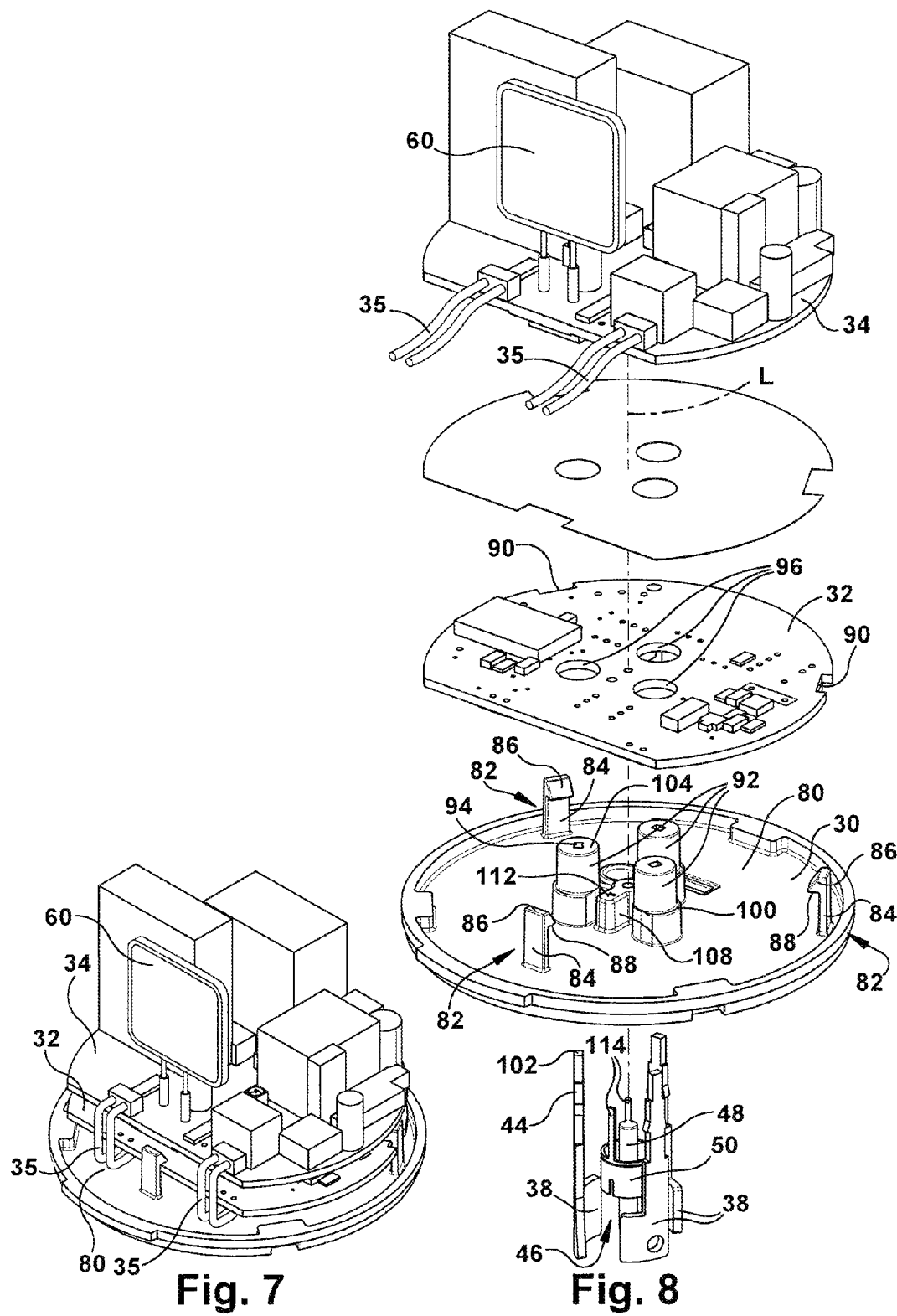

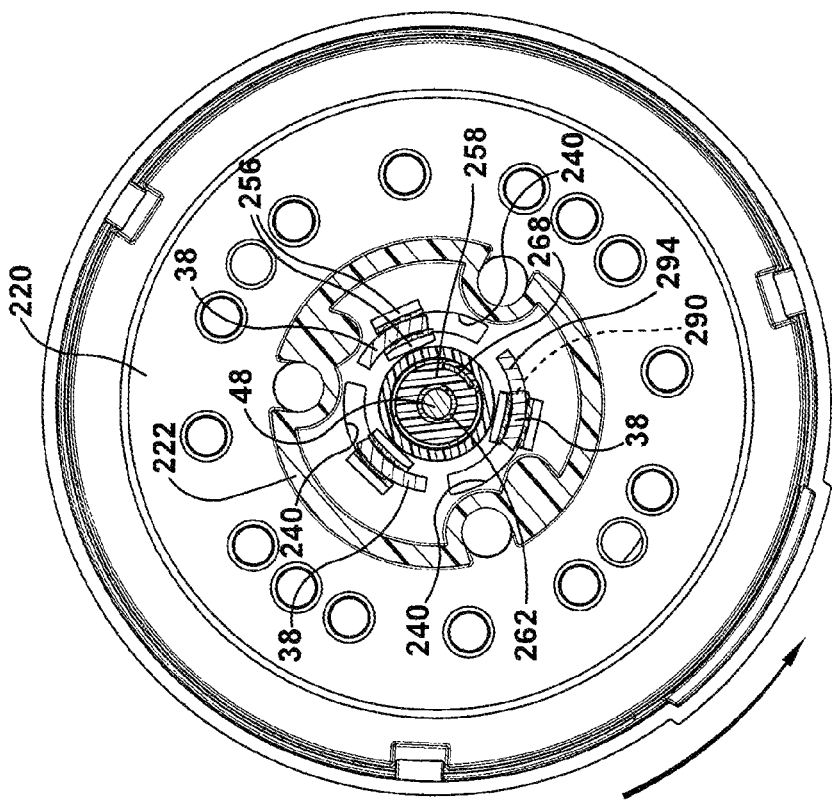
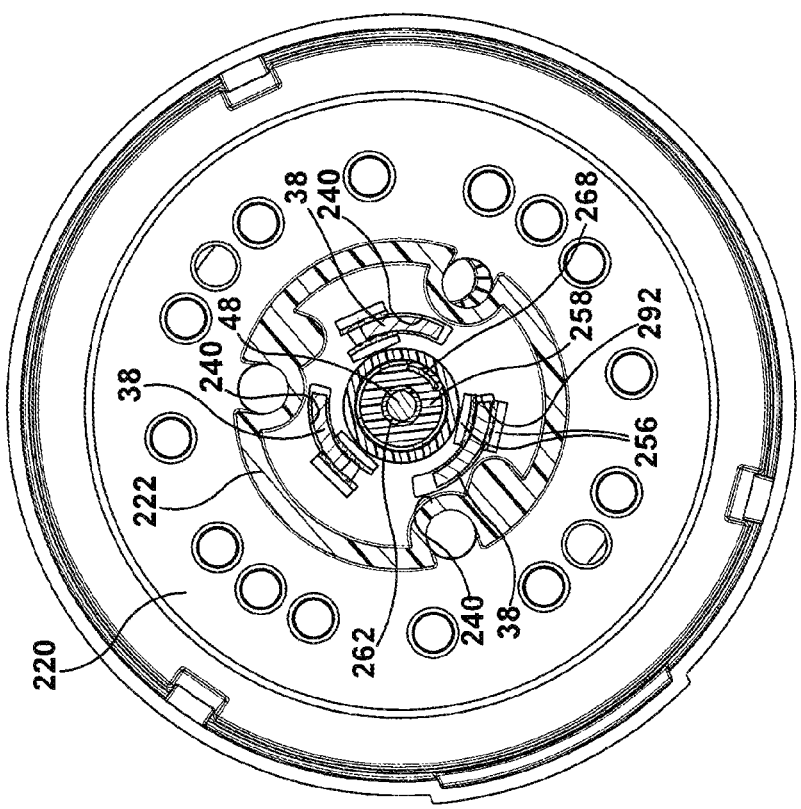

CONTROLLER DEVICE

RELATED PATENT APPLICATIONS

This patent application is a Continuation-in-part of the following U.S. patent applications Ser. No. 13/212,712, entitled "System assembly and design of photoelectric controller device"; Ser. No. 12/959,921 entitled, "Dimmable Outdoor Luminaires"; Ser. No. 13/224,698 entitled "Receptacle connector between controller and lighting fixture," which is a CIP of application Ser. Nos. 13/101,577; and 12/899,731 entitled "Outdoor Lighting System," all of which are incorporated herein by reference in their entireties.

FIELD OF THE INVENTION

This disclosure pertains to the construction, arrangement and function of male terminals of an electronic device, for example, a controller device used in connection with a light source.

BACKGROUND OF THE INVENTION

Lighting fixtures can be automatically switched on at dusk and off at dawn using twist-lock photoelectric controllers. The lighting fixtures may be used to light roads, parking lots and other areas outdoors. The photoelectric controller senses the intensity of the ambient light and switches the lighting fixtures on and off as appropriate. The photoelectric controllers are typically oriented so that the photosensor faces North, away from direct sunlight in the Northern hemisphere (and in a southerly direction in the Southern hemisphere). It is also desired to be able to easily adjust the receptacle that receives the photoelectric controller to achieve the desired orientation.

Lighting fixtures for street lights typically include an electrical receptacle that receives the photoelectric controller that is mounted to a housing on the top of the lighting fixture. The electrical receptacle is wired to the power supply of the lighting fixture. The photoelectric controller has three main terminals that are inserted into the electrical receptacle and twisted to lock the photoelectric controller to the receptacle.

In particular, the widely adopted standard for outdoor lighting fixtures includes a NEMA standard 3-terminal polarized twist-lock receptacle mounted to the top of the cobra head fixture, with the photoelectric (PE) detector housed in a module that plugs into the twist-lock receptacle and which allows rotation of the PE module so that the photo sensor faces generally North. The PE module includes a three-terminal twist-lock type connector coupleable to the twist-lock receptacle to provide three class 1 electrical connections between the controller module and the fixture assembly. In operation, the fixture is wired with the AC line connection wired from the fixture conduit to one terminal of the twist-lock receptacle and the input neutral wired to a second terminal of the twist-lock receptacle. The third twist-lock receptacle wire is connected to the light source ballast or driver and the PE module provides a switch connection between the AC line wire and the third twist-lock receptacle wire for selective connection/disconnection of power to/from the ballast or driver. This configuration allows easy replacement of the PE module, and such apparatus has served outdoor public areas as well as industrial, commercial, and residential lighting needs for many years. However, improved energy utilization is desirable by which outdoor lighting fixtures can be intelligently used to provide lighting without consuming excessive energy.

The orientation of the photoelectric controller in the Northern direction is accomplished by the use of a metal snap ring having fingers that engage the electrical receptacle and urge it toward the housing of the lighting fixture using a spring force. This is disclosed in U.S. Pat. No. 4,477,143. The electrical receptacle may be lifted up against the spring force and turned to orient the receptacle North. Circumferential holes located in an upper circular end plate of the electrical receptacle receive pins formed around an opening in the housing for securing the electrical receptacle to the housing. In another approach in which no snap ring is used, the electrical receptacle is oriented by loosening a screw in the top of the receptacle, rotating the receptacle until indicia on the receptacle points to the desired position and then re-tightening the screw.

The photoelectric controller is subjected to harsh environments at certain times and at certain locations. For example, the photoelectric controller may be used to control streetlights in arid climates where there are dust storms. It also may be subjected to snow and ice. The window may become coated with dust, snow and ice, interfering with proper operation of the photosensor. Maintenance vehicles will periodically spray the photoelectric controller with high pressure water to clean the window. High pressure water spray, high velocity dust, snow, ice and extended periods of direct sunlight is a problematic environment for a high voltage electronic device to be subjected to.

BRIEF DESCRIPTION OF THE INVENTION

A first general aspect of this disclosure features an electrical device including:

a housing and an electrically insulating base secured to the housing. A communication terminal protrudes from the base. Electrically conductive main terminals protrude from the base and are spaced apart from each other and from the communication terminal. The main terminals are arcuate shaped and form arcs of a reference ring the center of which is a rotational axis of the electrical device. The communication terminal is disposed within the reference ring.

Referring to a specific twist lock feature of the first aspect of this disclosure, the main terminals can be receivable in main terminal channels of a second electrical device. The electrical device and the second electrical device can be twisted relative to each other to lock the main terminals into electrical contact with main connectors aligned with the main terminal channels of the second electrical device. The communication terminal can contact a communication connector of the second electrical device throughout the twisting. The communication terminal can have any suitable shape that enables the twist locking of the electrical device with a second electrical device, for example, an arcuate shape. The communication terminal can be electrically conductive. The electrical device can be a controller. It should be appreciated that any of the specific features of the controller that are described in the Detailed Description can also be used in any combination to modify the first through fourth aspects of this disclosure.

Further specific features of the first aspect of this disclosure are that the communication terminal can be centrally located in the base. The communication terminal can comprise an electrically conductive pin having a circular cross-section. The communication terminal can comprise an electrically conductive ring shaped portion, or at least one electrically conductive arcuate portion, forming at least a part of a second reference ring. Still further, the communication terminal can comprise an electrically conductive pin having a circular cross-section and disposed around the pin is an electrically conductive ring shaped portion, or at least one electrically conductive arcuate portion, forming at least a part of a second reference ring, wherein the pin and the second reference ring are concentric to each other. The electrically conductive ring disposed around the electrically conductive pin having a circular cross-section can be an RCA terminal or connector. The main terminals and/or the communication terminal can be symmetrically located about the rotational axis.

Yet another specific feature of the first aspect of this disclosure are that the communication terminal can comprise two pins that are equally spaced from the rotational axis and sufficiently spaced from each other such that they are electrically isolated from each other.

Another specific feature of the first aspect of this disclosure is that the communication terminal can comprise a TRS type connector also known as an audio jack plug. Optionally disposed around the TRS type connector is an electrically conductive ring shaped portion, or at least one electrically conductive arcuate portion, forming at least a part of a second reference ring, wherein the TRS type connector and the second reference ring are concentric to each other.

A second aspect of the disclosure features a controller device including a housing and an electrically insulating base secured to the housing. A communication terminal protrudes from the base and includes an arcuate shape. Electrically conductive main terminals protrude from the base and are spaced apart from each other and from the communication terminal. The main terminals are arcuate shaped and radially spaced from the communication terminal. The main terminals form arcs of a reference ring that is concentric with at least a portion of the communication terminal.

Any of the specific features discussed above in connection with the first aspect of this disclosure can be used in any combination in the second aspect of the disclosure. In particular, the communication terminal can be disposed within the reference ring. Still further, the communication terminal can be disposed at a center of the base. Further at least a portion of the communication terminal can be aligned with a rotational axis of the controller device. The controller device can include electronic circuitry including a signaling electrical component that selectively provides a signaling control value along the communication terminal. The control value can be a 0-10V signal or a DALI signal, for example. Moreover, the communication terminal conductors can be used to switch in (or switch out) taps, inductors, or capacitors in an electromagnetically ballasted HID fixture to affect dimming of that fixture, for example, when the RCA type terminal is used. The controller can use multiple channels of control signals along the communication terminal. Thus, three or more conductors can be used in the communication terminal to add additional channels or control signals to the system. The electronic circuitry can include a photosensor in electrical communication with the signaling electrical component. The photosensor can be in electrical communication with one of the main terminals. The signals can be dimming signals (e.g., for dimming a lamp that is in electrical communication with the controller device). The main terminals can each be L- or P-shaped. The controller device can include electronic circuitry for enabling wireless communication between the controller device and at least one other external device. The communication terminal can be electrically conductive. The main terminals and/or the communication terminal can be symmetrically located about the rotational axis.

A third aspect of this disclosure features a controller device including a housing and an electrically insulating base secured to the housing. At least one printed circuit board is secured to the base in an interior of the housing. Communication circuitry that can send signals is disposed on the at least one printed circuit board. A communication terminal is secured in electrical contact with the communication circuitry on the at least one printed circuit board. The communication terminal has a circular and/or ring shape. Main electrically conductive terminals are secured in electrical contact with the at least one printed circuit board. The main terminals are each arcuate and L- or P-shaped and are spaced around the communication terminal.

Any of the specific features discussed above in connection with the first and second aspects of this disclosure can be used in any combination with the third aspect of the disclosure. For example, the printed circuit board can include circuitry that responds to changes in ambient light or detection of an object.

A fourth aspect of this disclosure features an electrical device including a housing and an electrically insulating base secured to the housing. A communication terminal protrudes from the base. Electrically conductive arcuate main terminals protrude from the base and are spaced apart from each other and from the communication terminal. The main terminals are receivable in main terminal channels of a second electrical device and the electrical device and the second electrical device are twisted relative to each other to lock the main terminals into electrical contact with main connectors aligned with the main terminal channels of the second electrical device. The communication terminal contacts a communication connector of the second electrical device throughout the twisting.

Any of the specific features discussed above in connection with the first through third aspects of this disclosure can be used in any combination with the fourth aspect of the disclosure.

Many additional features, advantages and a fuller understanding of the invention will be had from the accompanying drawings and the Detailed Description of the Invention that follows. It should be understood that the above Brief Description of the Invention describes the invention in broad terms while the following Detailed Description of the Invention describes the invention more narrowly and presents embodiments that should not be construed as necessary limitations of the broad invention as defined in the claims.

BRIEF DESCRIPTION OF THE DRAWINGS

FIG. 1 is a perspective view of a controller of this disclosure including its upper surface;

FIG. 2A is a perspective view of the controller of FIG. 1 including its lower surface;

FIG. 2B is a bottom plan view of the controller of FIG. 1;

FIG. 4A is a perspective view of a controller having another variation of the communication terminal in the form of a TRS type connector;

FIG. 4B is a bottom plan view of a portion of the controller showing the addition of arcuate portions of a communication terminal around the TRS type connector shown in FIG. 4A;

FIG. 4C is a bottom plan view of a portion of the controller showing the addition of a semicircular portion of a communication terminal around the TRS type connector shown in FIG. 4A;

FIG. 4D is a bottom plan view of a portion of the controller showing the addition of a ring shaped portion of a communication terminal around the TRS type connector shown in FIG. 4A;

FIG. 7 is a perspective view of an inside of the controller of FIG. 1 showing an assembly including a base plate and two circuit boards mounted on the base plate as well as a third printed circuit board;

FIG. 8 is an exploded perspective view of the assembly of FIG. 7;

FIG. 20 is a cross-sectional view of the interior of the receptacle (at the bottom of the exterior component) taken from a cutting plane extending transverse to an insertion axis of the receptacle showing the main terminals of the controller device inserted into main terminal channels of the exterior component into contact with the main connectors; and FIG. 21 is a cross-sectional view of the interior of the receptacle (at the bottom of the exterior component) taken from a cutting plane extending transverse to an insertion axis of the receptacle showing rotation of the controller device in a direction of the arrow relative to the receptacle when it is fixed in position.

DETAILED DESCRIPTION OF THE INVENTION

Figure 5:
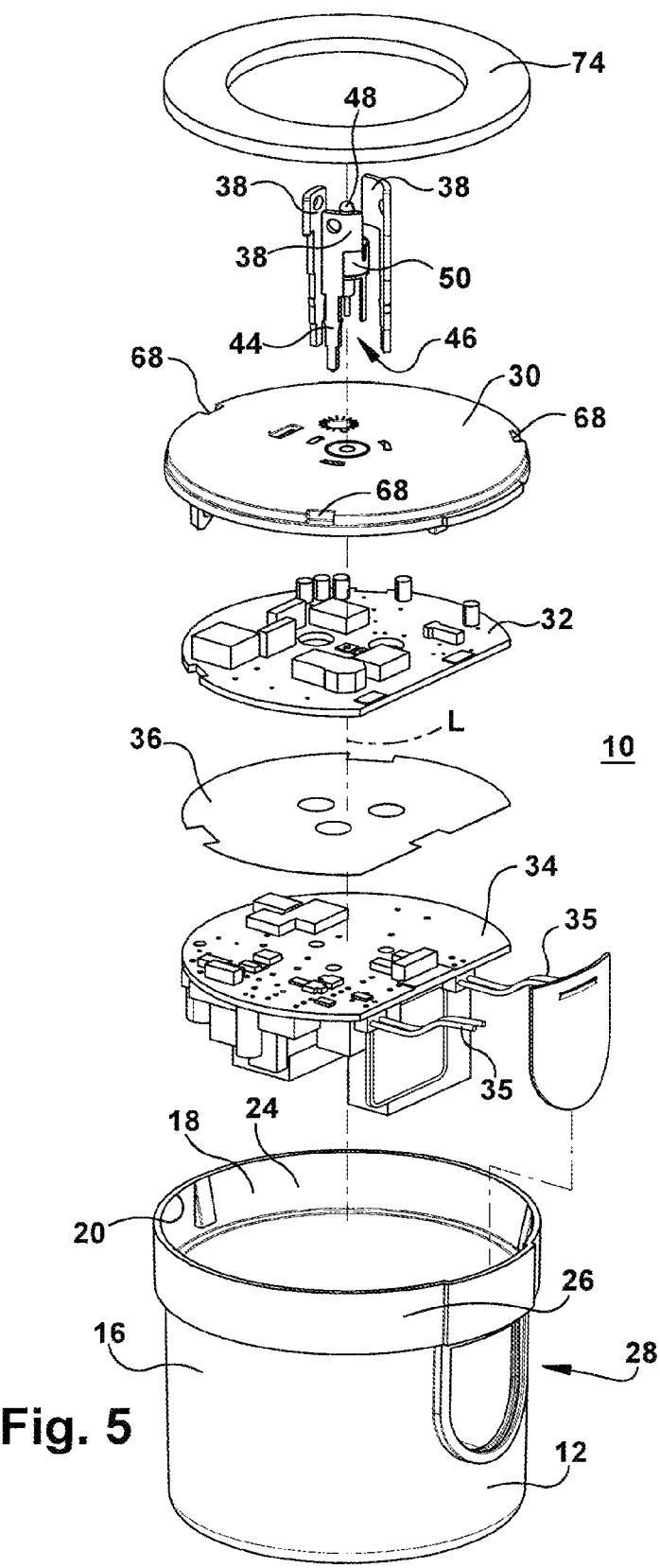
FIG. 5 is an exploded perspective view of the controller of FIG. 1.

Referring to FIGS. 1-5 of the drawings, a controller device 10 includes a housing or cover 12 in the shape, for example, of a generally cylindrical cup. The housing may be made of an electrically conductive and/or electrically insulating material, for example. The housing 12 includes an end (e.g., upper) surface 14 and a side wall 16 extending transverse from the end surface to a lip 18 that extends around an open end 20 of the housing 12 leading to its interior 22. The housing 12 is elongated along a longitudinal or rotational axis L and includes an interior surface 24 and exterior surface 26. A window 28 is disposed in the side wall 16 of the housing 12. An electrically insulating base (e.g., base plate 30) is secured to the housing near the open end 20. The following reference to PCBs used in the controller device is for purposes of example only. The controller may include different PCBs and circuitry than what is exemplified here. For example, outer and inner printed circuit boards (PCBs) 32, 34, which are electrically connected to each other such as by the electrical wires 35 between them, are disposed in the interior 22 of the housing 12 and are connected to the base plate 30 (FIG. 5). An electrically insulating polymer layer 36 is disposed between the PCBs 32, 34. Three main high voltage terminals or contacts 38 extend in a fixed position through the PCBs 32, 34 and protrude from the base plate 30, exterior to the base plate 30 and near the open (e.g., lower) end 20 of the housing 12 when it is installed on a lighting fixture 40.

The main terminals 38 provide power to the electronic circuitry of the PCBs 32, 34 and to the lighting fixture 40 as described in more detail below. The main terminals 38 are circumferentially positioned and spaced apart from each other in a generally circular orientation. In other words referring to FIG. 2B, the main terminals 38 are arcuate shaped and form arcs of a first reference ring the center of which can be the rotational axis L of the base. A fixed communication or dimming terminal 46 can be disposed within the first reference ring and protrudes externally from the base. The first reference ring is optionally concentric with at least a portion of communication terminal 46 (e.g., with a pin of the communication terminal having a circular cross-sectional shape). The main terminals can also be radially spaced apart from the centered communication terminal 46 or from the rotational axis. The inputs on the dimming conductors can be rated up to 600 VAC. Typical applications will commonly subject the pair of dimming conductors to around 250 VAC.

Each main terminal 38 is L- or P-shaped (FIG. 8) from a side view and generally arcuate from a bottom view (FIG. 2B) near the open end 20 external to the base plate 30 to facilitate electrical contact with connectors of a receptacle 42 during relative twisting between the controller 10 and the receptacle 42 that locks the controller and receptacle together. The main terminals 38 each include an elongated portion 44 extending inwardly from the external L- or P-shaped portion. The communication or dimming terminal 46 that protrudes from the base can be centrally located in the base and can be circular and/or ring and/or arcuate and/or semicircular shaped, forming at least a portion of a second reference ring. The second reference ring can be concentric to the first reference ring. The communication terminal 46 can include one, two, three or more members or portions. For example, as shown in FIGS. 2A and 2B the communication terminal 46 includes a central dimming pin 48 and a dimming ring 50 disposed around the dimming pin (e.g., an RCA terminal). The communication terminal 46 comprises the electrically conductive pin having a circular cross-section (the central dimming pin 48) and the electrically conductive ring shaped portion (the dimming ring 50) disposed around the pin, the pin and the ring shaped portion being concentric to each other. The dimming ring 50 and pin 48 are located at a center of the circular orientation or first reference ring of which the main terminals 38 form arcs (FIG. 2B). For example, the dimming pin 48 and dimming ring 50 extend through the outer PCB 32 and the base plate 30 exterior to and at the open end 20 of the controller 10. FIG. 1 shows the orientation of the housing 12 as it is secured to the lighting fixture 40 where the open end 20 faces down or directed toward the ground. The PCBs 32, 34 are formed of electrically insulating material such as FR-4, which stands for Flame Retardant Class 4 and is the UL grade designation for glass reinforced epoxy laminate sheets, tubes, rods and printed circuit boards (PCB). FR-4 is made of woven fiberglass cloth with an epoxy resin binder that is flame resistant.

Figures 2C, 2D:
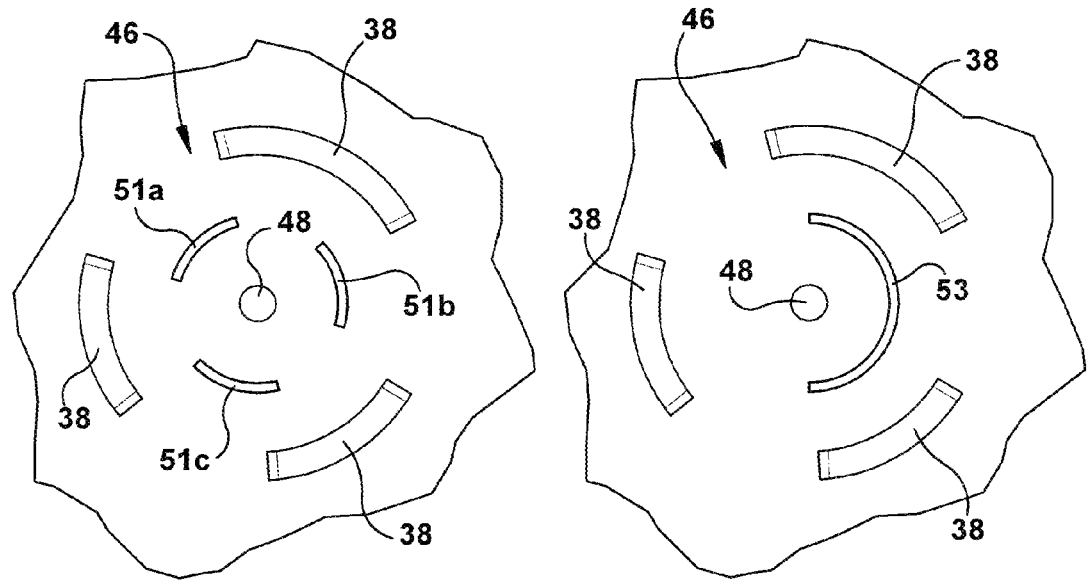
FIG. 2C is a bottom plan view of a portion of the controller showing a variation of its communication terminal compared to what is shown in FIGS. 2A and 2B.
FIG. 2D is a bottom plan view of a portion of the controller showing a variation of its communication terminal compared to what is shown in FIGS. 2A and 2B.

One variation of the communication terminal 46 of the controller shown in FIG. 2C employs electrically conductive arcuate portions 51i*a-c* forming part of the second reference ring disposed within the first reference ring of which the arcuate main terminals 38 form a part. The arcuate portions 51*a-c* extend around pin 48. At the center of the pin 48 may be located the rotational axis L of the controller device. Here, each communication terminal portion 51*a-c* extends along the second reference ring for about 60 degrees with about 60 degree gaps in between and can be located in a gap between adjacent main terminals 38. In another variation shown in FIG. 2D the communication terminal 46 includes a part that protrudes from the base in the form of an electrically conductive semicircular portion 53 composing a portion of the second reference ring. It should be appreciated by one of ordinary skill in the art in view of this disclosure, that the members or portions of the communication terminal may be any length, number and in any orientation, in particular, so long as the twist lock aspect of the controller is maintained. Because the portion of the corresponding connector in the receptacle that engages the ring shaped portion 50, arcuate portions 51*a-c* or semicircular portion 53 of the communication terminal can be circular, this enables variations of the shapes, sizes and orientation of the communication terminal portions while still permitting electrical connection between them during and after the twisting of the controller relative to the receptacle.

Figure 3A:
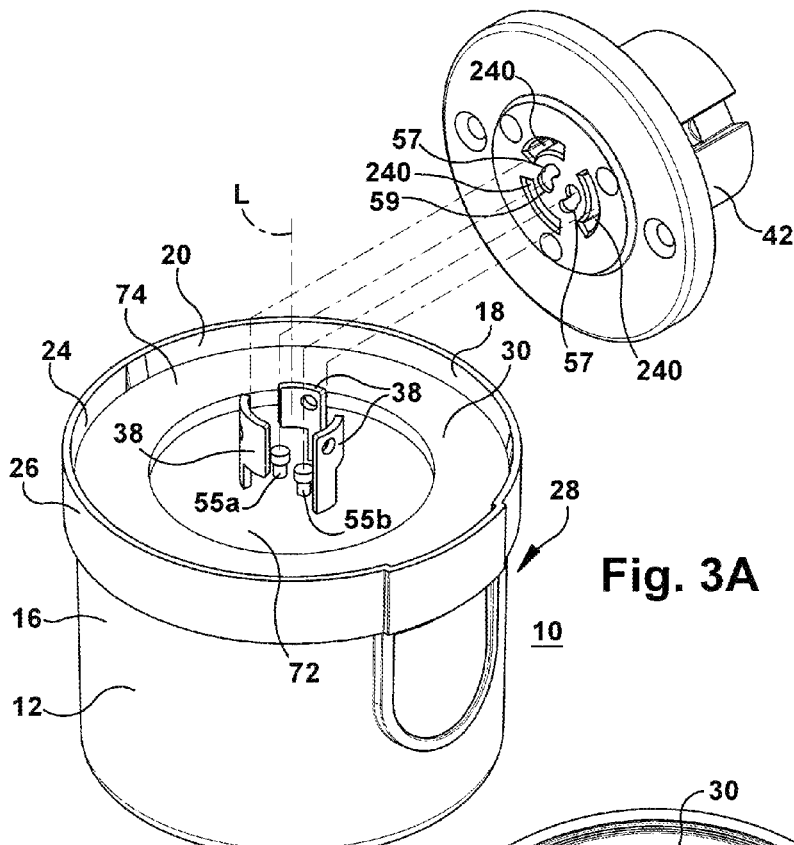
FIG. 3A is a perspective view showing a bottom of the controller showing a variation of the communication terminal of the controller compared to what is shown in FIGS. 2A and 2B and and also shows an electrical receptacle that receives the terminals of the controller.
Figure 3B:
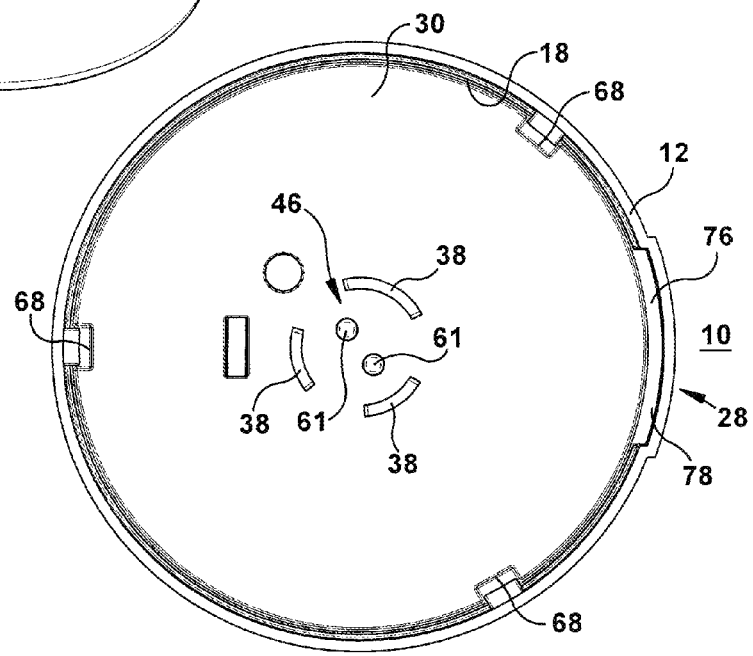
FIG. 3B is a bottom plan view of the controller shown in FIG. 3A.

Referring to FIG. 3A another variation of the communication terminal 46 is shown. Protruding from the base are one, two or more offset pins 55*a,b* spaced from the rotational axis L of the base. In these figures two pins are shown equally spaced from the rotational axis. The pins 55 may be diagonally disposed along a line segment between them that includes the rotational axis L. Or, so long as both pins 55*a, b* are equally spaced from the rotational axis L and sufficiently spaced from each other as to be electrically insulated when connected in the receptacle, they may be located closer together along the second reference ring than what is shown in FIG. 3B. An upper surface of one example of a receptacle 42 is shown in FIG. 3A which includes arcuate main terminal channels 240 discussed below and slots 57 having an enlarged portion 59 that receives a head 61 of the pins 55*a, b* enabling the pins to be retained in the slots. The slots 57 are arcuate and extend along a location corresponding to the second reference ring, enabling the twist locking of the controller device relative to the receptacle when the pins are moved in the slots and the main terminals move in the main terminal channels. Another ring shaped, arcuate or semicircular communication terminal may be disposed between the pins 55*a, b* and main terminals 38 such as is shown in FIGS. 2B, 2C and 2D.

Referring to FIGS. 4A-D, another variation of the communication terminal 46 includes a generally cylindrical shaped TRS (tip, ring, sleeve) type of connector or plug 63 also known as an audio jack plug protruding externally from the base. As defined herein, TRS type connector means a connector which typically includes 3 contacts but is also known to include two (TS) or four (TRRS) contacts. A center of the TRS type connector 63 may contain the rotational axis L. The first reference ring composed of the main terminals 38 may be concentric to the TRS type connector 63. The TRS type connector 63 shown in FIG. 4A, for example, includes electrically conductive sleeve 65, electrical insulator 67, electrically conductive ring 69, electrical insulator 71 and electrically conductive tip 73, which together form the general cylindrical shape of the plug. The electrically conductive portions of the TRS type connector are electrically isolated from each other by the electrical insulators. The communication terminal 46 may include only the TRS type connector 63. Alternatively, disposed between the TRS type connector 63 and the first reference ring and protruding from the base may be a member or portion of the communication terminal 46 in the form of a ring 50 (FIG. 4D), a semicircle 53 (FIG. 4C) or arcuate portions 51*a-c* (FIG. 4B), each of which forms all or a portion of the second reference ring which can be located within and concentric to, the first reference ring composed of the main terminals 38. Therefore, the communication terminal 46 may include two, three, four or more channels along which signals may be sent between the electrical circuitry of the controller and lighting fixture as discussed below.

The receptacle 42 may be configured to include a jack adapted to make electrical contact with the TRS type connector 63 in any manner known in the art, including that disclosed in published U.S. Patent application Pub. No. US 2012/0135645, which is incorporated herein by reference in its entirety. One or more jack contacts can electrically contact one or more electrically conductive portions (e.g., 65, 69, 73) of the TRS type connector to communicate signals through one or more respective channels as discussed below. The interior of the electrically conductive portions (65, 69, 73) of the TRS type connector 63 are electrically connected to the circuitry of the controller. The pins 55*a, b* shown in FIGS. 3A and B may be replaced with the TRS type connector 63 shown in FIG. 4A. The embodiment shown in FIGS. 4A-4D enables the twist lock function of the controller relative to another electrical device such as the receptacle 42.

While the particular communication terminal 46 shown in FIGS. 2A and 2B are shown in many of the figures and used to discuss the operation of the controller, it should be appreciated that any communication terminal 46 shown in FIGS. 2A-D, 3A,B and 4A-D and described herein may be employed in the controller of this disclosure.

Figure 6:
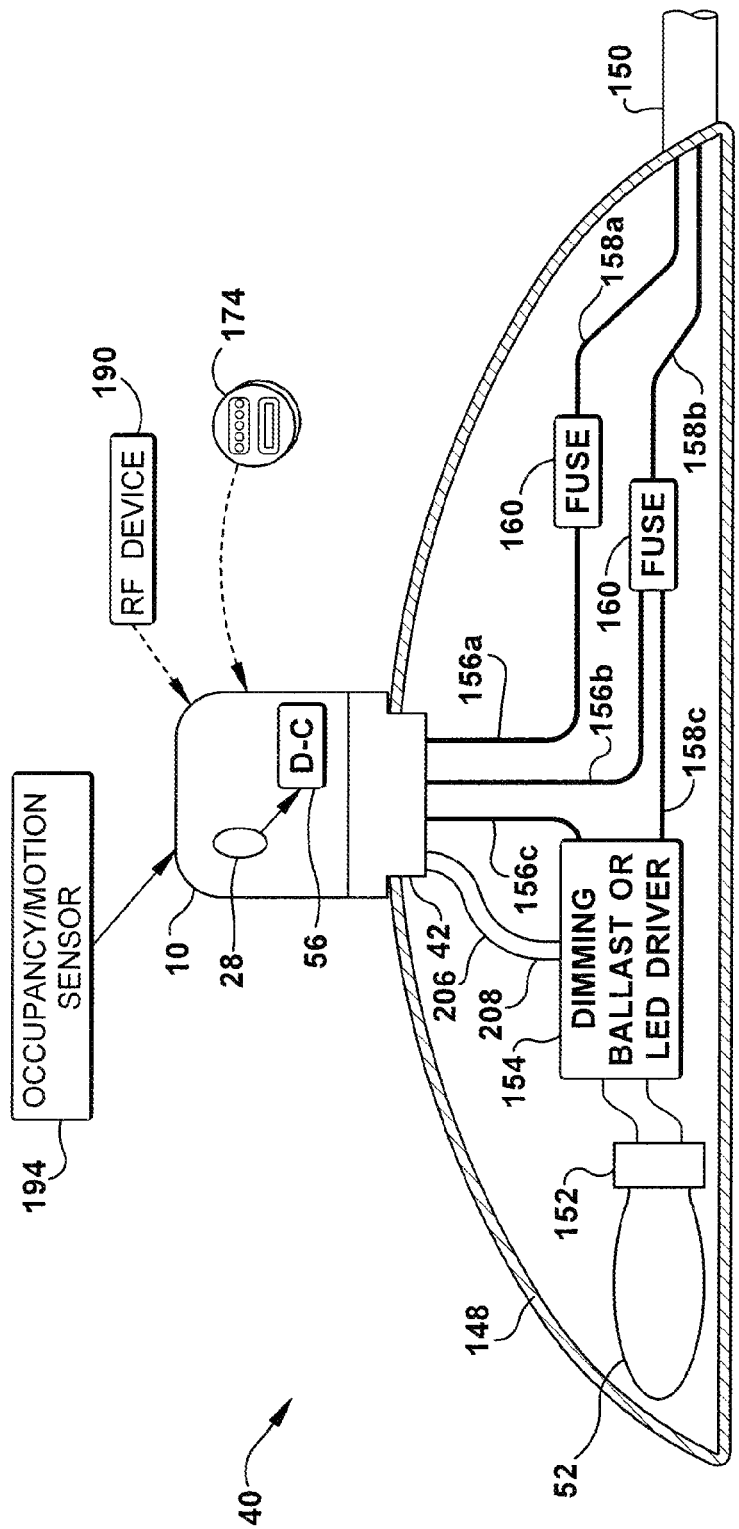
FIG. 6 is a cross-sectional diagrammatic view of a lighting fixture to which the controller device of FIG. 1 is electrically connected.

As seen in FIG. 6, the controller 10 is inserted and twisted to secure the main terminals 38 into electrical contact with connectors of a receptacle generally represented by 42 that has been secured to the top of a housing of a lighting fixture 40 such as a streetlight. One example of the receptacle 42 is disclosed in the Ser. No. 13/224,698 patent application, entitled, "Receptacle Connector Between Controller And Lighting Fixture," which is discussed in more detail below. This insertion and twisting also inserts and maintains the dimming pin 48 and ring 50 of the controller 10 into electrical contact with circular or ring shaped connectors of the receptacle, while the controller 10 is twisted during its installation atop the lighting fixture 40. The wiring of the lighting fixture 40 that connects to the receptacle 42 and to a lamp 52 and the circuitry of the controller 10 will be discussed below. On one of the PCBs 32, 34 is disposed an optional photosensor 54 that is aligned with the optional window 28 so that ambient light is used to control the operation of the lamp 52. In addition, dimming circuitry (a dimming control) 56 is disposed on at least one of the PCBs, enabling the lamp 52 to be dimmed at desired times, ambient lighting conditions or as instructed wirelessly from a remote location. In this regard, for example, a wireless communication device 58 can be disposed on a third PCB 60 that extends perpendicular to the inner PCB 34, which will be discussed in more detail below.

Figure 9:
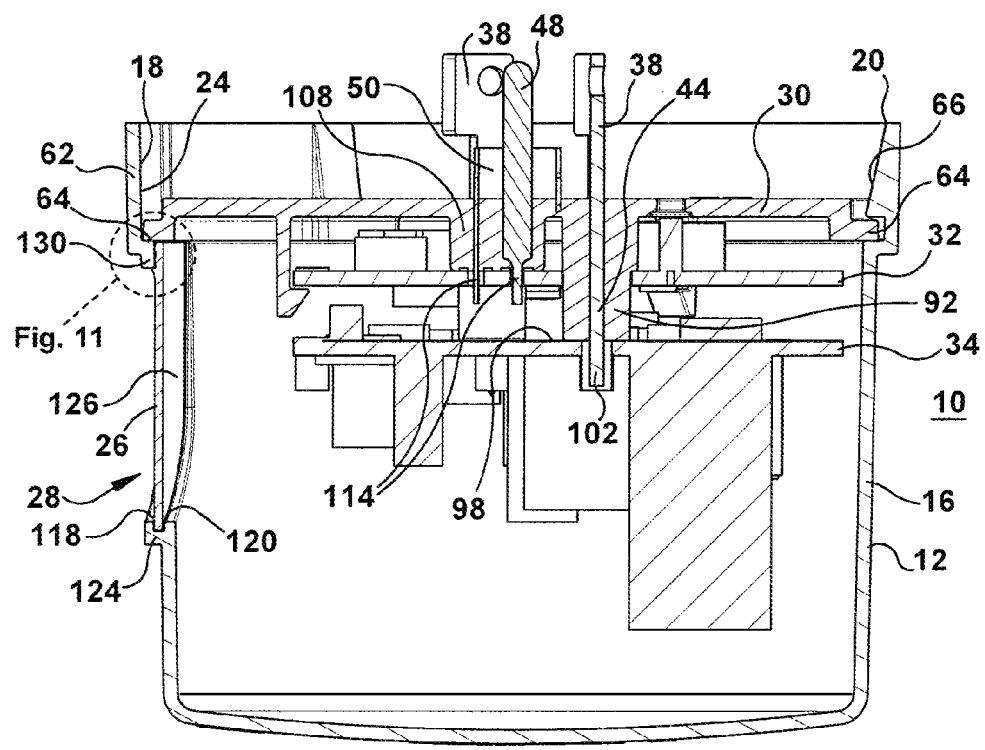
FIG. 9 is a cross-sectional side view of the controller of FIG. 1.

Referring to FIGS. 2A and 9, in one example design the housing 12 of the controller device 10 includes a larger diameter portion 62 near the open end 20 including a shoulder 64. The interior surface 24 of the housing 12 includes ramped surfaces or tabs 66 located outwardly of the shoulder 64 extending at a declining slope in the longitudinal direction L toward the open end 20. The base plate 30 is generally circular and is snap fit first against the ramped surfaces 66 when moved in the longitudinal direction towards the end surface 14, then into contact with the shoulder 64, which securely fastens the base plate 30 to the housing 12 and prevents movement of the base plate 30 along the longitudinal axis L toward the open end 20. Referring to FIG. 2B, the base plate 30 includes cutouts or recesses 68 from a lower surface thereof. Once the base plate 30 has been positioned so that the cutouts 68 are aligned with the ramped surfaces 66, snap fitting the base plate 30 positions the ramped surfaces 66 in each cutout 68, which prevents rotation of the base plate 30 relative to the housing 12. Polymeric resin 70 may also be deposited on outer surface 72 of the base plate 30 against the housing 12, to secure the base plate fixedly to the housing. An 0-ring 74 is constructed and positioned to extend into contact with the interior surface 24 of the housing at the lip 18 against the base plate 30, forming a seal between the controller device 10 and the receptacle 42 to which it is connected such as using a twist lock feature (FIG. 6). The base plate 30 can include a protrusion 76, for example, that fits into the longitudinal space 78 of the window 28 (FIG. 2A).

Referring to FIGS. 7 and 8, extending from inner surface 80 of the base plate 30 are spaced apart fingers 82 including a base portion 84 and having ramped surfaces 86 on interior end portions thereof each at a slope that inclines toward the open end 20. This enables the outer PCB 32 to be snap fit against the ramped surfaces 86 into contact with a retaining surface 88 adjacent the ramped surfaces 86, to securely hold the outer PCB 32 in place. The outer PCB 32 includes cutouts or recesses 90 where the fingers 82 are located to prevent rotation of the PCB.

Figure 10:
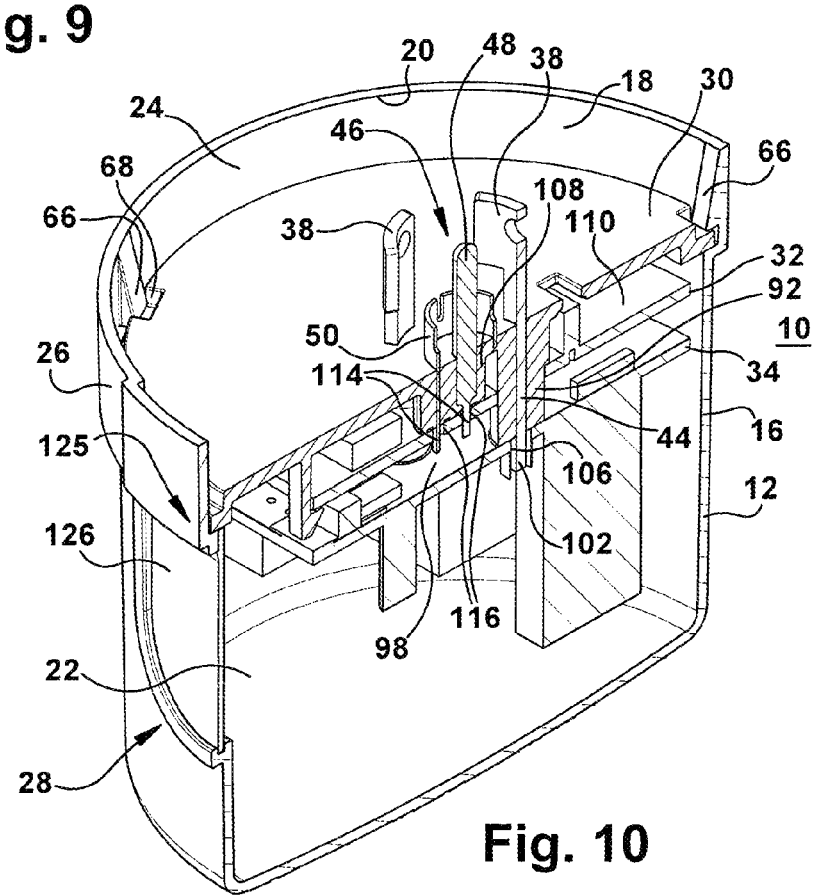
FIG. 10 is a perspective cross-sectional view of FIG. 9.

In one example design, the base plate 30 includes three electrically insulating main risers 92 extending from the inner surface 80 of the base plate. Each of the main risers 92 includes a passage 94 that receives the elongated portion 44 of the main terminals 38 in an interference fit. The main risers 92 pass through openings 96 in the outer PCB 32 and engage outer surface 98 of the inner PCB 34 where they can be secured with polymer resin. The main risers are secured with polymeric resin to the outer and inner PCBs 32 and 34. An inner end portion 102 of each of the main terminals 38 is exposed from an inner end 104 of the main riser 92 and extends through an opening 106 of the inner PCB 34 where it is soldered in electrical contact with circuitry on the inner PCB. The main riser 92 extends around the main terminal through the opening in the inner PCB 34 (see FIGS. 8-10). The dimming pin 48 and ring 50 can be molded to the base plate 30 in an electrically insulating riser 108 that extends to an outer surface 110 of the outer PCB 32. The inner end 112 of the riser 108 can be secured using resin to the outer PCB 32 Inner end portions 114 of the dimming pin 48 and ring 50 are exposed through the riser 108 and extend through openings 116 in the outer PCB 32 at which point they are soldered into electrical contact with circuitry on the outer PCB. The polymer composition of the base plate 30 is electrically insulating and ensures electrical isolation of the main terminals 38 with each other and with the dimming terminal 46, as well as electrical isolation of the dimming pin 48 from the dimming ring 50.

Figure 11:
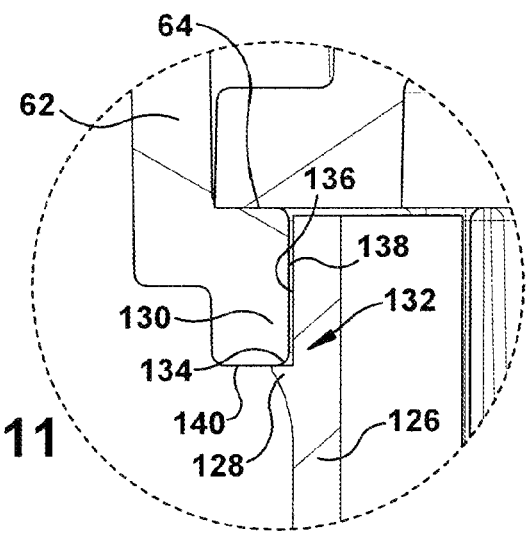
FIG. 11 is a detail view as seen by the dotted lines of FIG. 9.

Referring to FIGS. 1, 2A, 9 and 11, an example of a design of an optional window in the controller device will now be described. The window 28 in the housing 12 includes a window opening 118 formed in the side wall 16 of the housing 12. A channel 120 is formed in the side wall 16 around the window opening 118 in an outwardly extending portion 124 of the side wall 16 forming a window frame 125. A window pane 126 is formed of a light transmitting material such a polymer (e.g., polycarbonate) or quartz glass and has a curvature that follows a curvature of the side wall 16 of the housing 12. Referring to FIG. 11, the window pane 126 includes a protruding chamfered ridge 128 formed by an increasing incline from the body of the window pane in a direction along the longitudinal axis L toward a base 130 of the window frame 125. A shoulder 132 is formed near the bottom of the window pane 126 by surfaces 134 and 136. The protruding ridge 128 extends linearly generally parallel to a lower plane of the lip 18 of the housing 12. To install the window pane 126, the window pane is slid into the channel 120 in a direction of the longitudinal axis L toward the end surface 14, until the ridge 128 engages the base 130 of the window frame 125 (FIG. 11) at which point the window pane 126 deflects radially inwardly until it snaps in place once the ridge 128 clears the base frame 130. At this point the window pane 126 has moved radially outwardly so that the ridge 128 engages the base frame 130 and the shoulder 132 rests against the inside surface 138 and ledge surface 140 of the base frame. The window pane 126 can be installed in a water and dust resistant manner without the need for cement. A sealant or a polymer washer could be used around the periphery of the window, which is formed of heat cured epoxy, for example.

Figure 12:
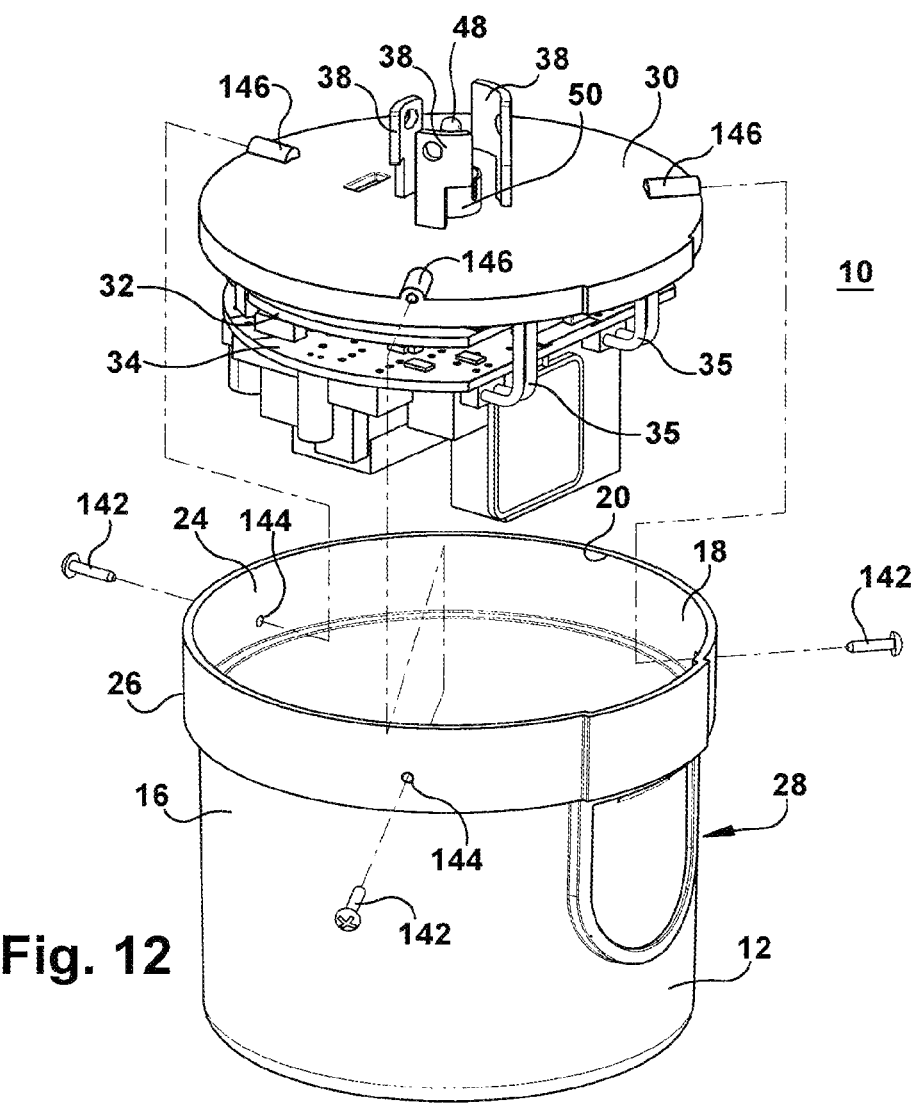
FIG. 12 is a perspective view showing an alternative way of securing the base plate to the housing of the controller.

Referring to FIG. 12, another way in which the base plate 30 can be secured to the housing 12 is by employing fasteners 142 such as screws. The housing 12 includes circumferentially spaced apart through holes 144 between the interior and exterior surfaces 24, 26 of the housing. Interiorly threaded portions 146 of the base plate 30 are aligned with the through holes 144. The screws 142 are threaded into the threaded portions 146 so that each head is tightened into contact with the exterior surface 26 of the housing 12, pulling the base plate 30 and the interior surface 24 of the housing 12 together, which secures the base plate into a fixed position against the housing.

For outdoor applications it is desired that the housing of the photocontroller is UV and IR stable for prolonged periods of time. Typically, polymeric materials are used for this application. However, a metal housing made of aluminum or aluminum alloy reinforced with oxides can be used for the housing. For ease of manufacturing, UV stabilized polymeric materials are used. Polymer degradation is a change in the properties—tensile strength, color, shape, etc.—of a polymer or polymer-based product under the influence of one or more environmental factors such as heat, light or chemicals such as acids, alkalis and some salts. The changes in properties are often termed "aging". The polymeric material that is being used should retain its structural properties for a prolonged period of time. There are several ways of avoiding UV degradation in plastics—by using stabilizers, absorbers or blockers. For many outdoor applications, the simple addition of carbon black at around a 2% level will provide the protection for the structure by the blocking process. Other pigments such as titanium dioxide can also be effective. Certain strength criteria and materials optical properties should be retained over the lifetime of the device. There are several commercial materials available for the photovoltaic industry by Dupont and SABIC. For example Rynite®(RT Dupont®) Polyester SUV resins were developed specifically for outdoor applications in the photovoltaic industry. Zytel® ST801AW BK195 is also an exterior weatherable material—a super-tough 66 nylon used for years in SUV roof racks. SABIC® Xenoy® and Valox® reinforced polycarbonate material also can be used for this purpose. The materials can be further coated with oxide or metal/metal alloys to further improve their weatherability.

Despite the harsh environment to which the controller device 10 is subjected, its design described herein withstands the high pressure water sprayed on it as determined by high pressure water spray tests. The photocontroller 10 passed water tests in which water was projected by a nozzle (6.3 mm) against the device from any direction had no harmful effects. The test duration was three minutes. Water was sprayed at a flow rate of 12.5 liters per minute at a pressure of 30 kN/m$^2$ at distance of 3 meters. In addition, the photocontroller passed dust exposure criteria in which ingress of dust need not be entirely prevented, but it must not enter in sufficient quantity to interfere with the satisfactory operation of the equipment. There was complete protection against contact. In addition the photocontroller passed the criteria of being dust tight in which there was no ingress of dust and complete protection against contact. The design of the photocontroller enabling it to pass high pressure water spray tests includes the base plate and housing connection and the design of the window.

Features of the lighting fixture and the controller device 10 are described in U.S. patent application Ser. No. 12/899,731, entitled "Outdoor Lighting System," portions of which are described below. FIG. 6 shows further details of an exemplary outdoor horizontal lighting fixture 40 with a fixture housing structure 148 having an inlet conduit 150 for receiving power wiring, where the fixture housing 148 may be mounted to a building or to a pole or other support structure for a particular outdoor lighting application. One or more light sources or lamps 52 are supported in the fixture housing 148 via sockets 152 connected with the dimming ballast or LED driver 154, such as incandescent lamps, fluorescent lamps, high intensity discharge (HID) lamps, LEDs or arrays thereof, etc. The light source(s) 52 is driven by the ballast or driver 154, also supported in the housing 148. In certain embodiments the twist-lock receptacle 42 is mounted to the top of the fixture housing 148 for connection of the controller device 10. The controller device 10 may include the optional photo sensor 54 operative to sense ambient light near the lighting fixture 40 for controlling turn on and turn off timing or dimming in certain embodiments. The twist-lock connection between the controller device 10 and the receptacle 42 provides electrical connection via wires 156a, 156b, and 156c, with two input wires 158a and 158b routed into the housing 148 via the conduit 150, which may optionally be terminated at fuses 160. In one example, a first phase (line) wire 156a connects the power line from the first fuse 160 to a first receptacle terminal or main connector spade (for connection through the receptacle to one of the main terminals of the controller device) and a second wire 156b connects the power neutral to the second terminal or another main connector spade (for connection to another main terminal of the controller device), with the neutral also being connected from the optional second fuse 160 to the driver or ballast 154 via wire 158c. The power line is selectively switched by the controller device 10 and provided to the ballast or driver 154 via a switched line wire 156c connected to one of the main connector spades (for connection to another main terminal of the controller device), such that the ballast or driver 154 is selectively powered or unpowered by the operation of the controller device 10 which may include a load rated relay contact 162 (FIG. 13) operative according to a switch control signal from the primary microcontroller 164 of the controller device 10 to selectively couple the incoming line connection 156a with the switched power line 156c. It should also be appreciated that another phase conductor may be used in addition to the first phase wire instead of or in addition to the power neutral. For example, the controller could switch one or both phase conductors. A dimming control signal may be introduced from a dimming control/command component 56 of the controller device to within the fixture housing 148 (FIG. 6) through the twist-lock receptacle 42, such as by including a fourth and/or a fifth conductor (the communication terminal 46) to convey this signal to the dimming ballast or driver 154 within the housing 148. The dimming control signal from the dimming control/command component 56 passes along the communication terminal 46 of any of the designs shown and described in this disclosure (e.g., shown in FIGS. 2A-D; FIGS. 3A and 3B; and FIGS. 4A-D). The main terminals 38 and the communication terminal 46 of any of the designs shown and described herein are electrically connected to the circuitry of the controller 10 as shown and described herein or in a manner that would be apparent to one of ordinary skill in the art reading this disclosure. In addition, the electrical device to which the controller 10 is electrically connected (e.g., the electrical receptacle 42) includes suitable structure and electrical connectors, such as what is shown and described herein, or in a manner that would be apparent to one of ordinary skill in the art reading this disclosure, that cooperates with the structure of the main terminals 38 and communication terminal 46 of any of the designs shown and described in this disclosure (e.g., shown in FIGS. 2A-D; FIGS. 3A and 3B; and FIGS. 4A-D). For example, referring to FIG. 6, signaling wires 206, 208 have connectors fastened on them that fasten, for example, to the exterior end portions of the first and second central connectors 260, 268 of the receptacle 42 for electrical connection, for example, to the signaling terminals 48, 50, respectively, of the controller device 10 on one end and are electrically connected to the dimming ballast or driver 154 and associated dimming circuit at the other end.

Figure 13:
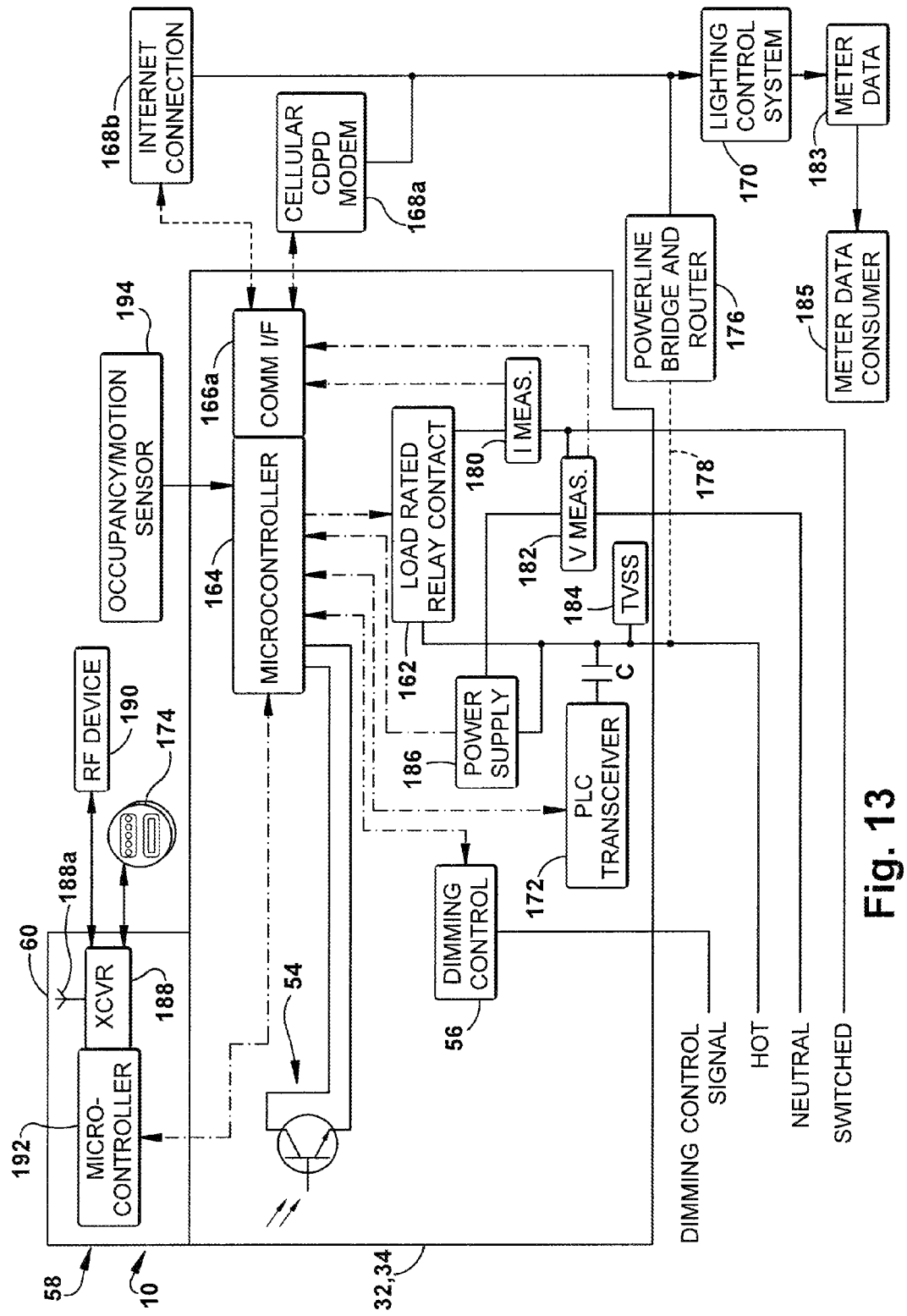
FIG. 13 is a block diagram explaining an example circuitry of the controller device and other devices to which it may communicate.

As shown in the example controller circuitry of FIG. 13, the controller device 10 includes a dimming component (dimming command or control component) 56, which can be any suitable circuitry, hardware, processor-executed software or firmware, logic, etc., which operates to selectively provide one or more dimming control values or signals to the ballast or driver 154 through the twist-lock receptacle 42 so as to cause the ballast or driver 154 to provide dimmable output from the light source(s) 52. The dimming component 56 may be operatively coupled to a microcontroller 164 of the controller device that includes a transceiver with an antenna for RF communications to one or more protocols with other RF devices, other RF-enabled fixtures, and/or with one or more RF-enabled utility meters. The primary microcontroller 164 includes a communications interface 166a providing communications interfacing with an Internet connection bridging component 168b and/or with a CDPD modem bridging device 168a for ultimate connection with the lighting control system 170. In addition, the controller device 10 may include a Power Line Communication (PLC) transceiver 172 and a coupling capacitance C allowing the primary microcontroller 164 to communicate with other lighting fixtures 40, meters 174, and/or a powerline bridge and router 176 via signaling connections 178 on one or both of the line power connections. Moreover, the controller device 10 may also include current and/or voltage measurement or sensing circuitry or components 180 and 182 for sensing input or switched power conditions for intelligent (e.g., feedback-type) dimming control. The lighting control system 170 can obtain meter data 183 desired from a meter data consumer 185 from PLC-enabled utility meters 174.

The controller device 10 can include transient voltage surge suppression (TVSS) 184 for protecting the controller device 10 from voltage surges on an input power line. An example TVSS device 184 for use in the module is a metal oxide varistor (MOV) surge suppressor. The input power line supplies power to a power supply 186 (e.g., at 120-480 volts), which can include a transformer, rectifier and a voltage regulator circuitry. The power supply 186 supplies power, for example DC power, to various components within the controller device 10, such as the primary microcontroller 164 and dimming control 56.

The controller device 10 can include a wireless communications printed circuit board 60 (which can be positioned perpendicular to the inner and outer PCBs)(FIGS. 8 and 13). The wireless communications printed circuit board 60 (e.g., the third PCB) has a transceiver 188 with an antenna 188a (which can extend on the inner surface of the housing) for RF communications according to one or more protocols with other RF devices 190 (e.g., external RF control devices), other RF-enabled light fixtures, and/or with one or more RF-enabled utility meters 174. In an embodiment, the wireless communications printed circuit board 60 includes a microcontroller 192 for controlling the RF communications of the transceiver 188. The microcontroller 192 on the wireless communications printed circuit board 60 communicates with the primary microcontroller 164, which can allow for wireless remote control of the lighting fixture 40. In an embodiment, the RF communications of the transceiver 188 are directly controlled by the primary microcontroller 164, and the microcontroller 192 on the wireless communications printed circuit board 60 is optional.

The controller device 10 in certain embodiments also includes the photo sensor 54 which senses ambient light proximate the lighting fixture 40 and provides a sensed light signal or value to the dimming component 56. Instead of or in addition to the photosensor 54, an infrared sensor or visible detector (e.g., a camera) may be used. Moreover, the controller may not include a photosensor but may communicate through a network with other controllers on other lighting fixtures at least one of which has a photosensor. The dimming or signaling component 56 selectively provides the dimming/signaling control value or values (e.g., 0-10V or DALI signal, bi-level switching, diagnostic and/or feedback messages, etc.) along the communication terminal to the ballast or driver 154 in certain embodiments based, for example, on the sensed light signal or value. This occurs, for example, through connection from the dimming or signaling control/command component 56 of the controller device via contact between the controller central pin terminal 48 and the first central connector 260 and through connection from the dimming or signaling control/command component of the controller device via contact between the controller ring terminal 50 and the second central connector 268, and appropriate connection from the exterior end portions of the first central connector and the second central connector using wires 206, 208 in the lighting fixture leading to the ballast or driver 154 (e.g., and a dimming or status signal circuit associated with it). The two signaling connections through the receptacle 42 could include one primary signal and one standby/back-up signal, or one electrical signal and one RF signal, for example. The dimming component 56 may be programmed or otherwise configured to provide dimmed light via the dimming control value selection at dawn and/or dusk for reduced power consumption and for aesthetic lighting, rather than the conventional full on/full off operation. In certain embodiments, moreover, the dimming component 56 may be operative to selectively dim the light output during certain times for energy conservation, for instance, to dim unused roadways to a safe but efficient level in the middle of the night, with possible dimming control modification/override according to signals or values received from an occupancy/motion sensor 194 operatively coupled with the primary microcontroller 164. In certain embodiments, moreover, the dimming control component 56 may be implemented as one or more software components executed by the primary microcontroller 164. The dimming control component 56 can include dimming control switches that are settable by a user to program various dimming parameters, such as dimming level for example. Alternatively, such dimming parameters can be set by downloading parameter settings to the controller device 10, either locally or remotely.

In certain embodiments, the dimming component 56 is operative to selectively provide the dimming control value based at least in part on a received RF signal or value from an external RF device 190. For instance, an RF command signal can be sent to the controller device 10 wirelessly (and such signal can be sent to multiple controller devices 10) for initiating dimmed, full on, full off, flashing operation, or combinations thereof by a control device 190 having an RF transmitter, thus allowing security personnel to control outdoor lighting operation. The dimming component 56 may thus provide the dimming control value(s) to control the light output according to one or more criteria, some of which may be externally actuated (e.g., via the photoelectric sensor 54, motion sensor 194, and/or RF device 190 or combinations thereof) and some of which may be preprogrammed in the controller device 10. The controller device 10 without the photosensor may employ an astronomical timer which, having information as to the current time of day and its longitude and latitude coordinates, can operate to determine sunrise and sunset throughout the year. This information can be used by the circuitry of the controller 10 to control dimming or switching of the light source at any desired time such as at sunrise and sunset.

In addition to the wireless communications printed circuit board 60, the controller device 10 can include one or more printed circuit boards 32, 34 (e.g., outer and inner PCBs) containing components and circuitry not provided on the wireless communications PCB. For example, components such as the TVSS 184, power supply 186, load rated relay 162 and photo sensor 54 can be provided on the inner circuit board 34, while the dimming control component 56 and primary microcontroller 164 can be provided on the other outer circuit board 32. Additional circuitry and/or components, or different variations of the circuitry and/or components, can be provided on either circuit board 32, 34. If only one printed circuit board is used, it can include all of the circuitry enclosed by the box 32 or 34 shown in FIG. 13. In addition, the second printed circuit board (oriented generally parallel to or orthogonal to the first board) can includes circuitry for enabling wireless communication between the controller device and another device at a remote location (i.e., the circuitry of wireless communications printed circuit board 60).

The system may also include one or more occupancy/motion sensors 194 operatively coupled with one of the RF-enabled outdoor lighting fixtures 40 or otherwise coupled with the network. For instance, the controller device 10 may be operatively coupled with a motion sensor 194 to receive a wired or wireless signal (e.g., via transceiver and antenna 188, 188a) therefrom indicating detected or sensed motion or person/vehicle occupancy near and/or lit by the lighting fixture 40, and the dimming component 56 is operative to selectively provide the dimming control value based at least in part on a sensed motion light signal or value from the motion sensor 194. For example, the dimming component 56 may increase a dimmed power level (or go to full-on operation from a previously dimmed setting) when motion is sensed and continue this modified operation for a predetermined time or until a separate reset command is received at the controller device 10. In other embodiments, the dimming control signal can be varied for output light flashing operation based at least in part on a received motion detection signal from the sensor 194.

Figure 14A:
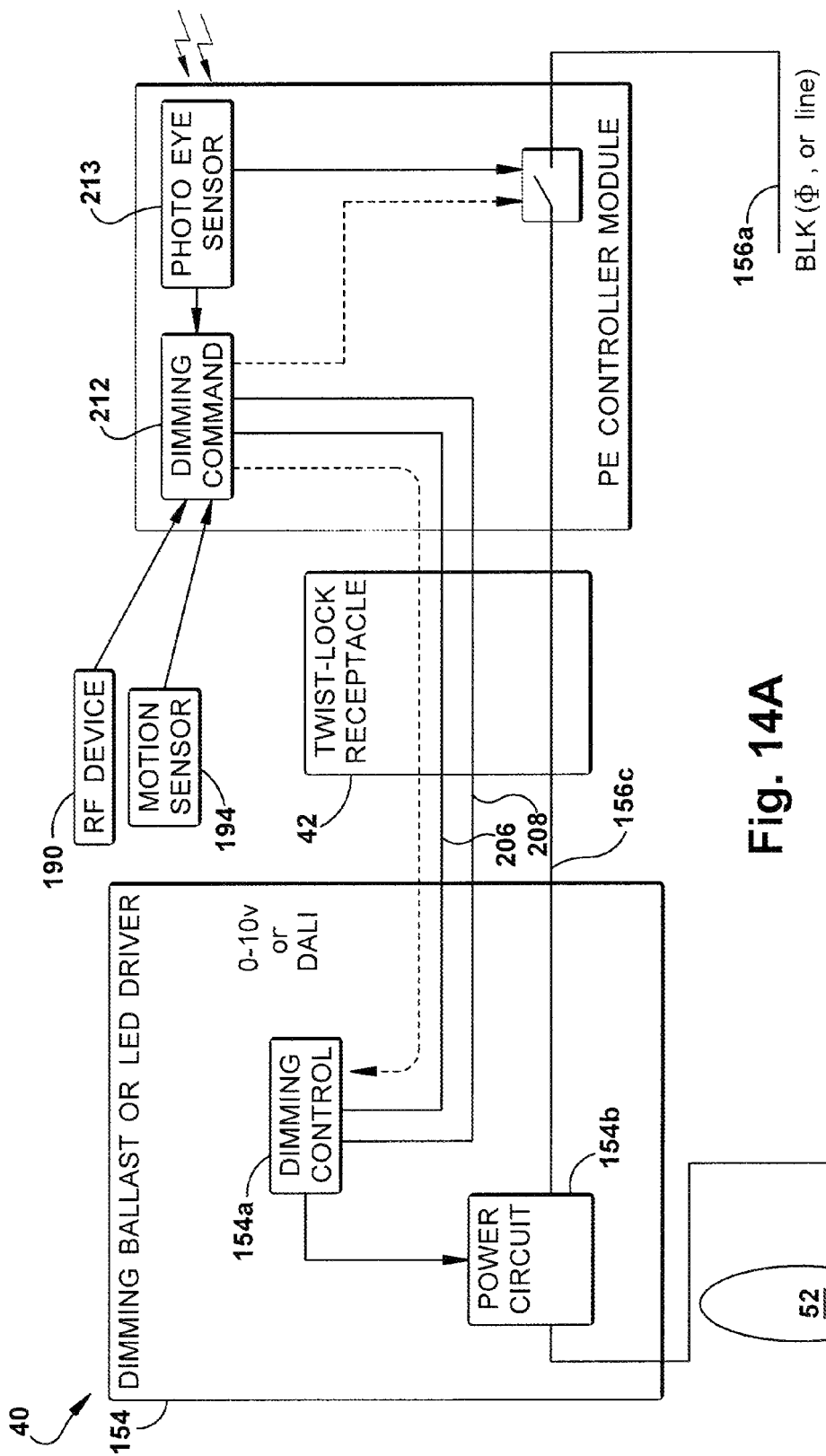
FIG. 14A is a schematic view illustrating an example of further details of the controller of FIG. 1 and the lighting fixture of FIG. 6.
Figure 14B:
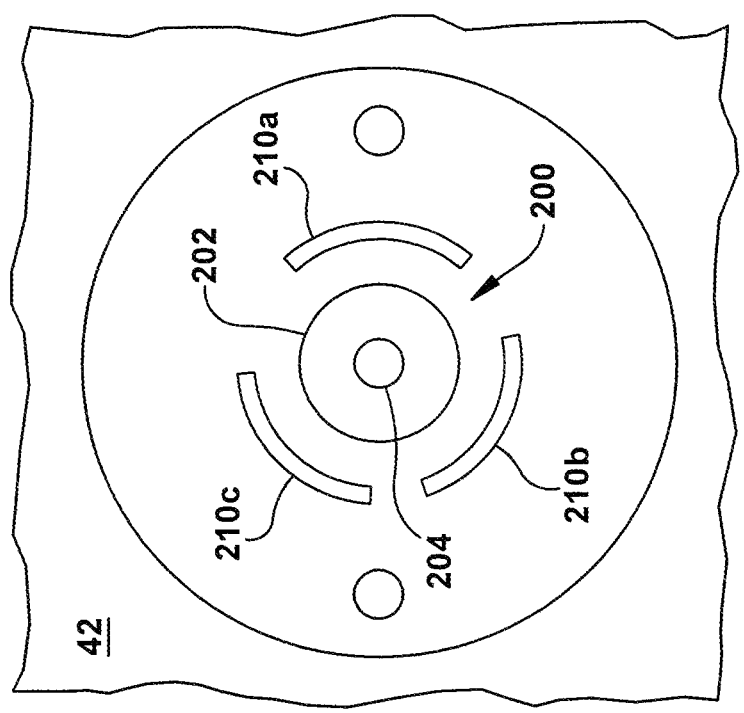
FIG. 14B is a partial top plan view illustrating a female receptacle arrangement with a female two-contact RCA-type central communication connector in a 3-terminal polarized twist-lock receptacle.

Further details of an example of the controller device 10 and lighting fixture and their operation can be seen from FIGS. 14A and 14B, and the following description, which are excerpted from patent application Pub. No. 2012/0139426, entitled, "Dimmable Outdoor Luminaires." FIGS. 14A and 14B illustrate a further embodiment in which the twist-lock receptacle 42 includes a communication connector 200 with first and second communication terminals 202, 204 and wires 206 and 208 (FIGS. 6 and 14A) are coupled from the first and second terminals 202, 204, respectively to the dimming ballast or driver 154. The receptacle connector 200 in this example is an RCA type female connector mounted at the center of the receptacle 42 such that rotatable engagement of a corresponding male connector of the controller device 10 is possible while accommodating rotational twisting engagement of the male blades (main terminals) 38 of the controller device with the corresponding arcuate female connector terminals via the slots or main terminal channels 210a, 210b, and 210c in the upper surface of the receptacle 42. In the illustrated embodiment, the controller device 10 has a corresponding male RCA connector (central communication terminal) with a single centrally located pin 48 for engaging the second terminal 204 of the receptacle connector 200 as well as a cylindrical male connector (ring 50) for engaging the outer first terminal 202 of the connector 200. In the simplified circuit shown in FIG. 14A, which may be a part of or different than the circuit shown in FIG. 13, the dimming command/control component 212 of the controller device 10 is connected to provide a 0-10v or DALI signaling to the terminals 202 and 204 via appropriate circuit connections with wires 206 and 208 of the lighting fixture conveying the dimming signal to the dimming control 154a of the ballast or driver 154 to its power circuit 154b to cause the ballast or driver 154 to provide dimmable output from the light source 52. The dimming command 212 and switched power along line 156c may operate in response to sensing of lighting conditions by the photo sensor 213 or in response to other suitable device such as an RF sensor, motion sensor or astronomical timer.

It should be appreciated by one of ordinary skill in the art from reading this disclosure that different first electronic devices having the aforementioned main terminals and central communication terminal can be used instead of a controller device and can be electrically connected to different second electronic devices instead of the aforementioned electrical receptacle, while still taking advantage of the unique twisting action that electrically connects the two electronic devices together. That is, the main terminals of the first electronic device are received in main terminal channels of the second electrical device and the first electrical device and the second electrical device are twisted relative to each other to lock the main terminals into electrical contact with main connectors aligned with the main terminal channels of the second electrical device, and the communication terminal (e.g., electrically) contacts a communication connector of the second electrical device throughout the twisting. Each of the main terminals, communication terminal, main connectors and communication connector may be electrically conductive or not (e.g., optical channels).

The following includes an excerpt from the Ser. No. 13/224,698 patent application entitled "Receptacle connector between controller and lighting fixture," which is provided to enable a better understanding of how a controller device engages an electrical receptacle using the twist lock feature. Although not all of the details of the electrical receptacle and variations of it are fully described here this can be had by referring to the Ser. No. 13/224,698 application, all aspects of which can be used with the controller device of this disclosure. The figure and reference numbers used below are changed compared to what is used in the Ser. No. 13/224,698 patent application. The second controller device shown in FIGS. 15-21 may differ in some respects from the controller device shown in FIGS. 1-12 but both controller devices can be used with the receptacles described herein especially with regard to the twist lock feature.

Figure 15:
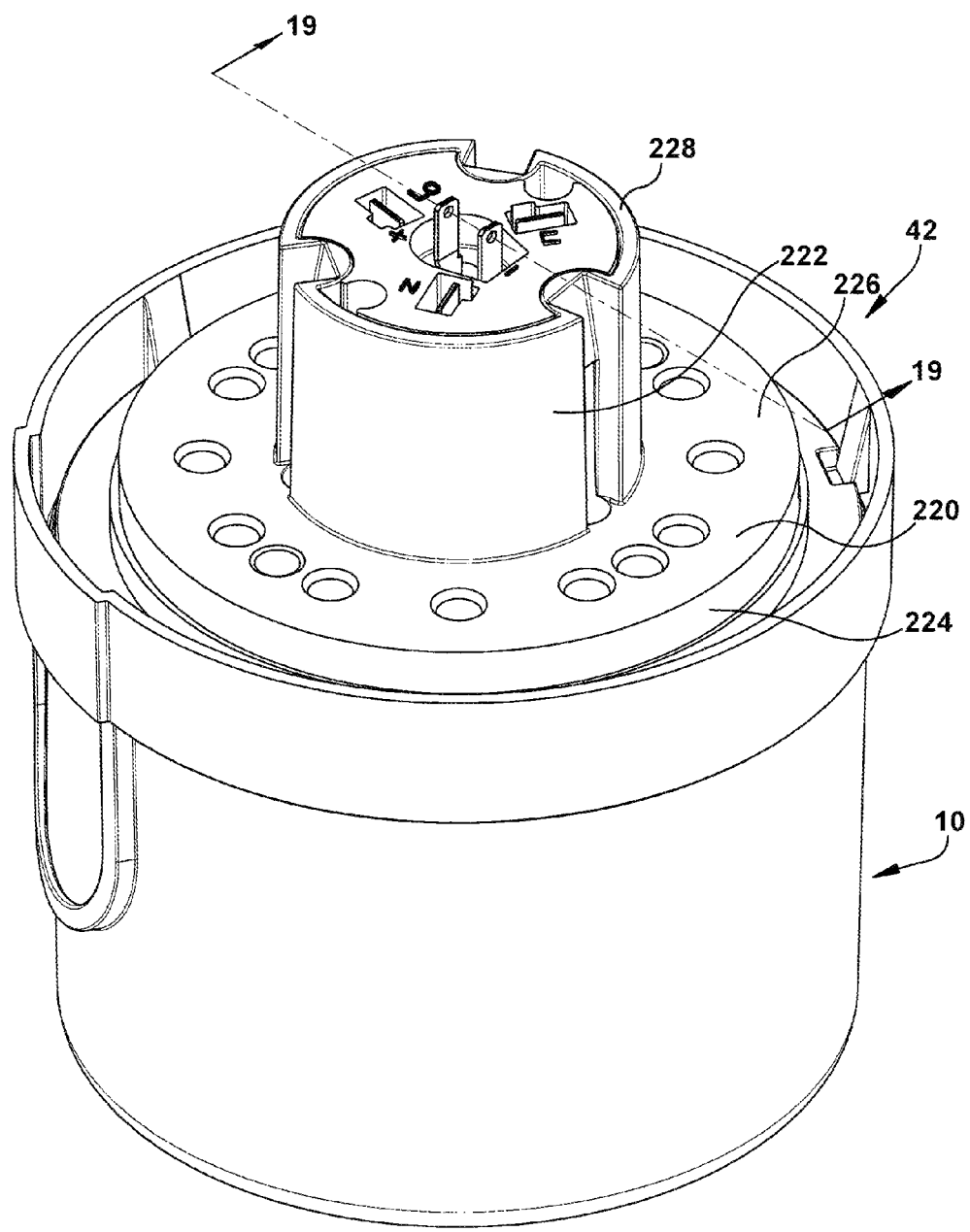
FIG. 15 is a perspective view of a second controller device electrically connected to an electrical receptacle of this disclosure.
Figure 16:
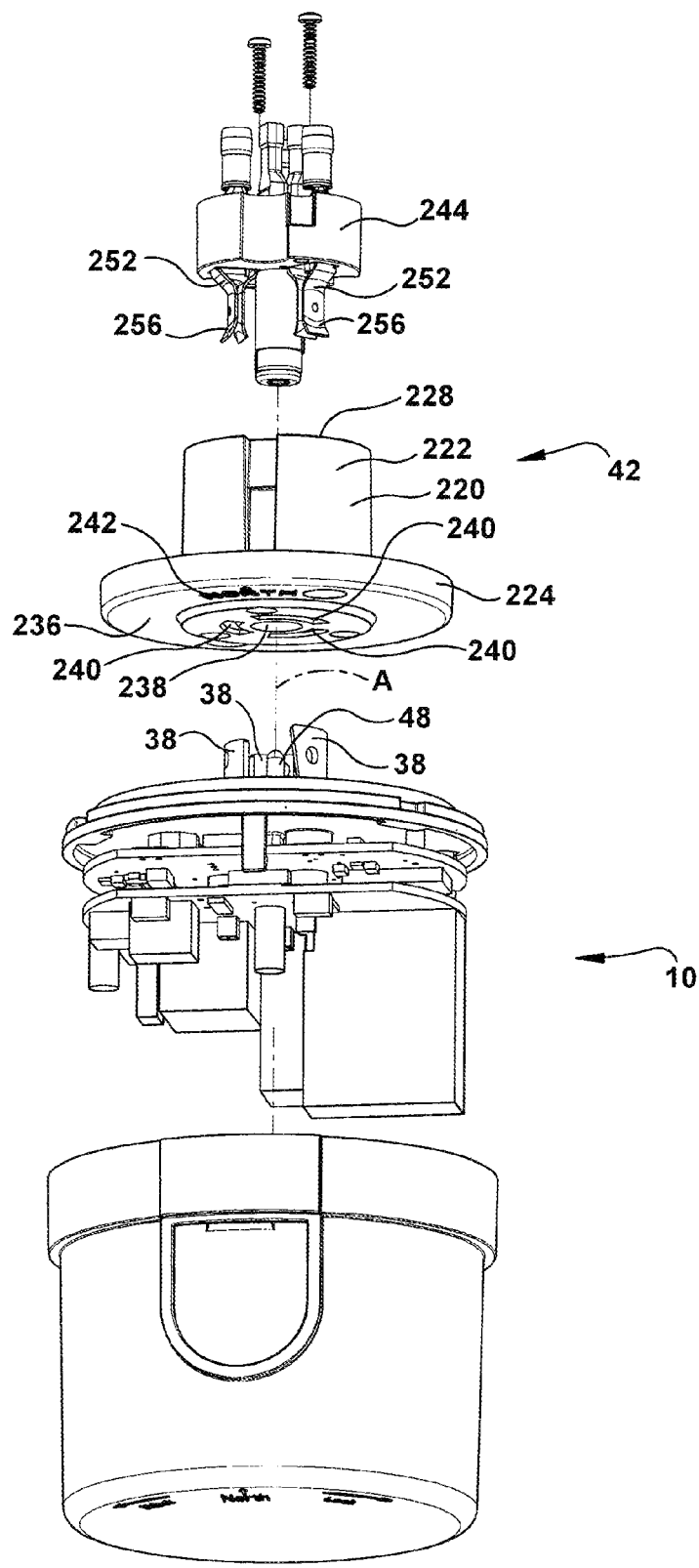
FIG. 16 is an exploded perspective view showing the second controller device and interior and exterior components of the electrical receptacle.
Figure 17A:
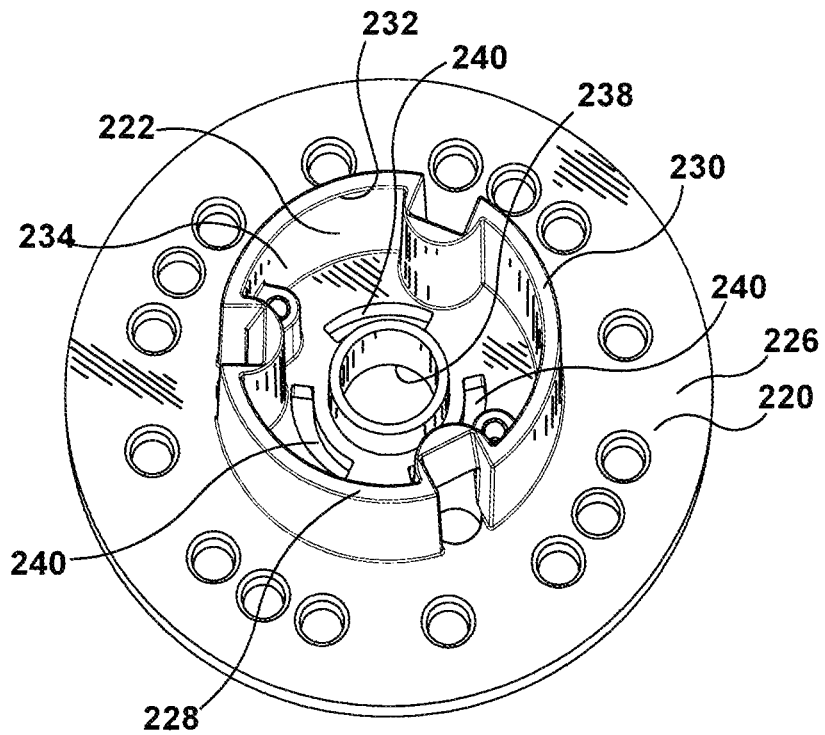
FIG. 17A is a bottom plan view and FIG. 17B is a top plan view of the exterior component of the receptacle.
Figure 17B:
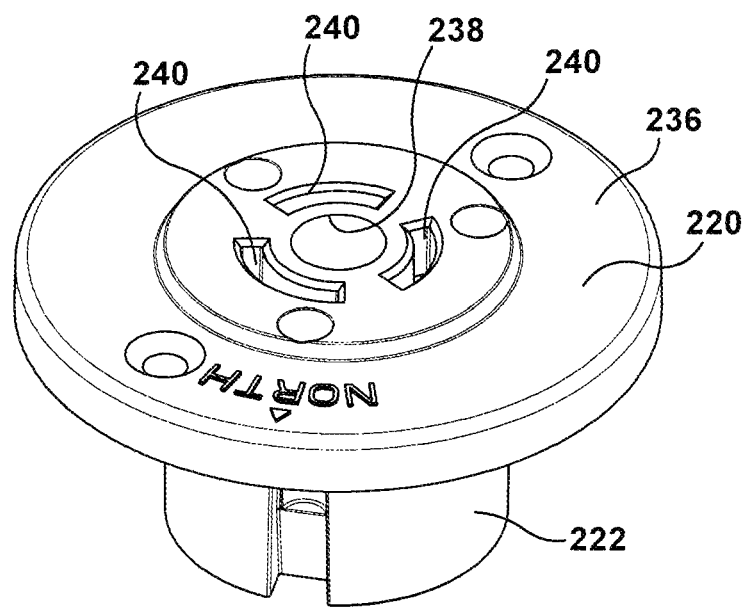
Figure 18A:
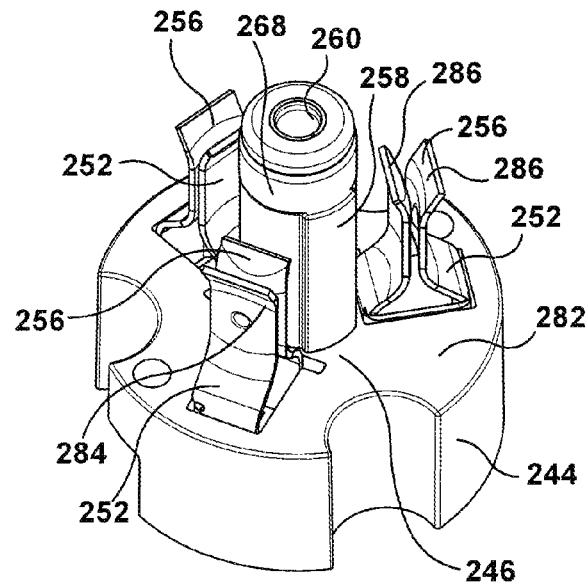
FIG. 18A is a perspective view showing a top of the interior component of the receptacle with its connectors in place.
Figure 18B:
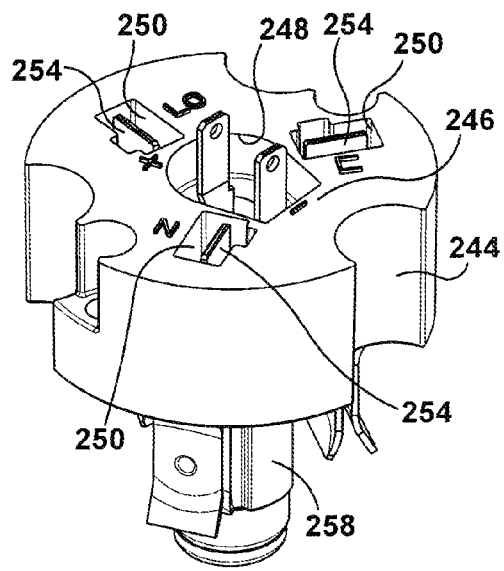
FIG. 18B is a perspective view of the bottom of the interior component with the connectors in place.
Figure 18C:
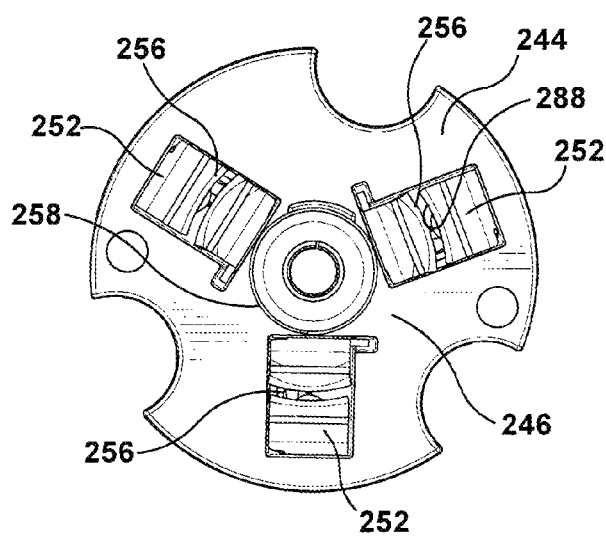
FIG. 18C is a top plan view of the interior component.
Figure 19:
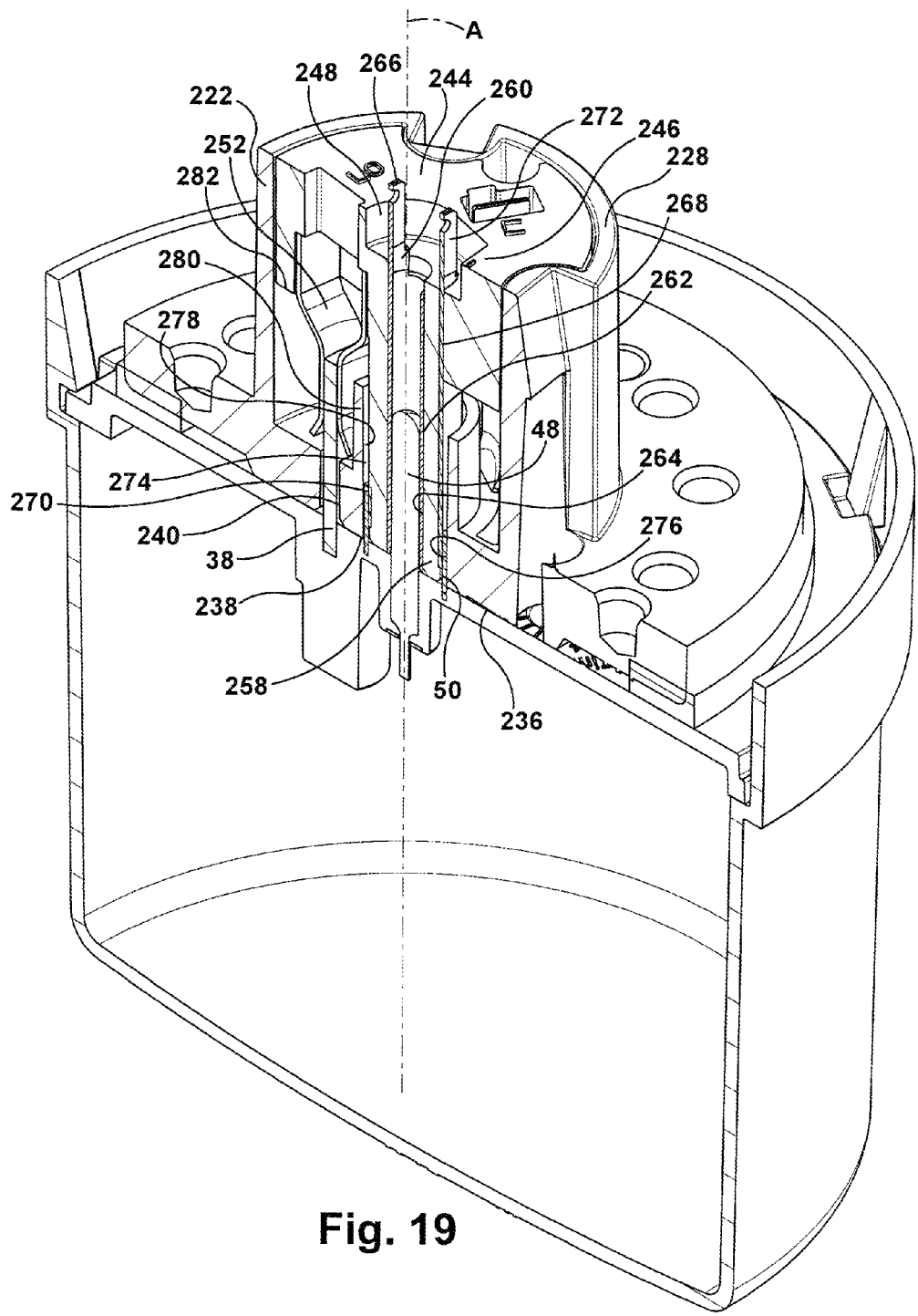
FIG. 19 is a cross-sectional view as seen from the cutting plane labeled by the arrows 19-19 of FIG. 15.

One example of a twist-lock electrical receptacle 42 includes an exterior component 220 made of electrically insulating material that has a cup shaped body 222 (FIGS. 16, 17A, 17B). An end plate 224 is located at one end of the body. A lower surface 226 of the end plate is shown in FIG. 15. An insertion end 228 is spaced apart from the end plate along an insertion axis A and is located at a rim 230 forming a mouth 232 of the exterior member leading to an interior 234 of the body 222. The end plate also includes an upper surface 236. The end plate includes a central, (e.g., circular) opening 238 and arcuate main terminal channels 240 located circumferentially around and radially spaced from the central opening. Referring to FIG. 16, in the position in which the receptacle is located relative to the top of the lighting fixture, the upper surface 236 of the end plate includes indicia 242 indicating North, this being a known feature of twist lock receptacles. Referring to FIGS. 16 and 18A-C, an interior component 244 of the receptacle made of electrically insulating material is received along the insertion axis A into the interior 234 of the body 222. At the insertion end the interior component 244 includes a central portion 246 including one or more signaling connector openings 248 and has main connector openings 250 radially spaced from and circumferentially disposed around the central portion (FIG. 18B). Main electrical connectors 252 have exterior end portions 254 extending in the main connector openings 250 at the insertion end and have interior end portions 256 in the interior of the body 234 disposed in alignment with the main terminal channels 240 (FIG. 19). A hollow elongated member or tube 258 made of electrically insulating material is formed integrally with the interior component 244 extending from the central opening 238 of the end plate to the central portion 246 of the interior component (FIGS. 18A and 19). Referring to FIG. 19, a first central connector 260 has an arcuate shape, i.e., a substantially circular (e.g., tubular) portion 262, disposed inside the elongated member 258 at the central opening 238 of the end plate and extending downwardly from there along a length of the interior component, forming a cylindrical opening 264 therein, and has an exterior end portion 266 extending to the central connector opening 248 of the interior component at the insertion end 228. A second central electrical connector 268 has an arcuate shape, i.e., a substantially circular (e.g., ring-shaped) portion 270, disposed around the tubular portion 262 of the first central connector and that can be disposed in the central opening 238 of the end plate. The second central connector 268 has an exterior end portion 272 extending to the central connector opening 248 of the interior component at the insertion end 228. An elongated portion of the second central connector 268 extends along a length of the interior component between the ring-shaped portion 270 and the exterior end portion 272. The second central connector 268 can be embedded in the tubular member 258 along its length. Referring to FIGS. 16, 20 and 21, the main terminals 38 on controller device 10 can be received in the main terminal channels 240 and the receptacle 42 and controller device 10 can be twisted relative to each other to lock the main terminals 38 into electrical contact with the interior end portions 256 of the main connectors 252. Once the main terminals 38 of the controller device 10 have been inserted into the main terminal channels 240, the central pin signaling terminal 48 and the surrounding central ring signaling terminal 50 of the controller device electrically connect to the tubular portion 262 of the first central connector 260 and the ring-shaped portion 270 of the second central connector 268, respectively, throughout and after the twisting.

Referring to FIG. 19, when the interior component 244 including its electrical connectors is inserted into the interior of the body 222 of the exterior component 220, the tube member 258 extends into the central opening 238 of the end plate 224 so as to form an annular opening 274 between the tube member and wall portion 276 of the end plate forming the central opening 238 of the end plate 224. Internal wall 278 of collar 280 and the wall portion 276 forming the central opening 238 are coextensive. The tubular portion 262 at the interior end of the first central connector 260 can extend to the upper surface 236 of the end plate 224. The ring-shaped portion 270 of the second central connector 268 can be spaced along the insertion axis A away from the upper surface 236 of the end plate 224 toward the insertion end 228. As seen in FIG. 19, the main connectors 252 have been pushed into the interior component 244 from its upper or interior end face 282 and are locked in place. Each of the main connectors 252 has a clamp portion 284 at the interior end portions 256 which is positioned in alignment with the main terminal channels 240 (FIGS. 18A, 19). The clamp portion 284 flexibly resists separation of diverging fingers 286 at the interior end portions 256 of the main connectors 252, thereby forming a snug fit when the arcuate shaped main terminals 38 are received between the fingers 286 of the main connectors 252. Between the fingers may be formed an arcuate slot 288 (FIG. 18C) to receive the arcuate shaped main terminals. The controller main terminals 38 fit into the main terminal channels 240 into contact with the main connectors 252. The controller pin signaling terminal 48 fits into the cylindrical opening 264 in the tubular portion 262 of the first central connector 260. The controller ring signaling terminal 50 fits in the annular space 274 into contact with the ring shaped portion 270 of the second central connector 268. The main controller terminals 38 are L or P-shaped as is known in the art (FIGS. 2A, 20, 21) such that when the controller device 10 is rotated relative to the receptacle 42, the controller main terminals 38 move circumferentially inside the main terminal channels 240 until a stem 290 of the main terminals contacts a side wall 292 of the main terminal channels. An overhanging portion 294 of the main terminals locks the controller device 10 to the receptacle 42 such that the controller device cannot be moved upwards along the insertion axis A.

The receptacle 42 includes three of the main connectors 252 and the central connectors include at least the tubular portion 262 of the first central connector 260 and the ring portion 270 of the second central connector 268, for example, for a total of at least 5 electrical connections through the receptacle between the terminals of the controller device and the wiring of the lighting fixture. Additional signaling terminals on the controller device and connectors in the receptacle could be used such as by adding further concentric conductive rings. Connectors for electrically connecting the wiring of the lighting fixture to the connectors of the receptacle at the insertion end are shown in FIG. 16 for example.

The controller device 10 is able to twist lock and form suitable electrical connections with the electrical receptacles of the second and third embodiments of the Ser. No. 13/224,698 application. In both of these embodiments, the electrical receptacle has an upper end that the controller device engages, which has similar features present at the upper end 26 of the receptacle described above. However, the receptacles of the second and third embodiments of the Ser. No. 13/224,698 otherwise have different structures. For example, the receptacle of the second embodiment includes a hollow elongated member or tube made of electrically insulating material formed integrally with an exterior component of the receptacle extending from a central opening of an end plate to a central connector opening of an interior component. The receptacle of the third embodiment is formed of one piece.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. An electrical device comprising:
 a housing and an electrically insulating base secured to said housing;
 a communication terminal that protrudes from said base; and
 electrically conductive main terminals protruding from said base and spaced apart from each other and from said communication terminal, wherein said main terminals are arcuate shaped and form arcs of a reference ring the center of which is a rotational axis of said electrical device, said communication terminal being disposed within said reference ring.

2. The electrical device of claim 1 wherein said main terminals are receivable in main terminal channels of a second electrical device and said electrical device and said second electrical device are twisted relative to each other to lock said main terminals into electrical contact with main connectors aligned with said main terminal channels of said second electrical device, and said communication terminal contacts a communication connector of said second electrical device throughout said twisting.

3. The electrical device of claim 1 wherein said communication terminal comprises two pins that are equally spaced from said rotational axis and sufficiently spaced from each other such that they are electrically isolated from each other.

4. The electrical device of claim 1 wherein said communication terminal has an arcuate shape.

5. The electrical device of claim 1 wherein said communication terminal is electrically conductive.

6. The electrical device of claim 1 which is a controller.

7. The electrical device of claim 1 wherein said main terminals and/or said communication terminal are symmetrically located about said rotational axis.

8. The electrical device of claim 1 wherein said communication terminal comprises a TRS type connector.

9. The electrical device of claim 8 wherein disposed around said TRS type connector is an electrically conductive ring shaped portion, or at least one electrically conductive arcuate portion, forming at least a part of a second reference ring, wherein said TRS type connector and said second reference ring are concentric to each other.

10. The electrical device of claim 1 wherein said communication terminal is centrally located in said base.

11. The electrical device of claim 10 wherein said communication terminal comprises an electrically conductive pin having a circular cross-section.

12. The electrical device of claim 10 wherein said communication terminal comprises an electrically conductive ring shaped portion, or at least one electrically conductive arcuate portion, forming at least a part of a second reference ring.

13. The electrical device of claim 10 wherein said communication terminal comprises an electrically conductive pin having a circular cross-section and disposed around said pin is an electrically conductive ring shaped portion, or at least one electrically conductive arcuate portion, forming at least a part of a second reference ring, wherein said pin and said second reference ring are concentric to each other.

14. A controller device comprising:
a housing and an electrically insulating base secured to said housing;
a communication terminal that protrudes from said base and includes an arcuate shape; and
electrically conductive main terminals protruding from said base and spaced apart from each other and from said communication terminal, wherein said main terminals are arcuate shaped and radially spaced from said communication terminal, wherein said main terminals form arcs of a reference ring that is concentric with at least a portion of said communication terminal.

15. The controller device of claim 14 wherein said communication terminal comprises an electrically conductive pin having a circular cross-section.

16. The controller device of claim 14 wherein said communication terminal comprises an electrically conductive ring shaped portion, or at least one electrically conductive arcuate portion, forming at least a part of a second reference ring.

17. The controller device of claim 14 wherein said communication terminal comprises an electrically conductive pin having a circular cross-section and disposed around said pin is an electrically conductive ring shaped portion, or at least one electrically conductive arcuate portion, forming at least a part of a second reference ring, wherein said pin and said second reference ring are concentric to each other.

18. The controller device of claim 14 wherein said main terminals are each L- or P-shaped.

19. The controller device of claim 14 including electronic circuitry for enabling wireless communication between said controller device and at least one other external device.

20. The controller device of claim 14 wherein said communication terminal is electrically conductive.

21. The controller device of claim 14 wherein said main terminals are receivable in main terminal channels of a second electrical device and said controller device and said second electrical device are twisted relative to each other to lock said main terminals into electrical contact with main connectors aligned with said main terminal channels of said second electrical device, and said communication terminal electrically contacts a communication connector of said second electrical device throughout said twisting.

22. The controller device of claim 14 wherein said communication terminal is disposed within said reference ring.

23. The controller device of claim 22 wherein said communication terminal is disposed at a center of said base.

24. The controller device of claim 22 wherein at least a portion of said communication terminal is aligned with a rotational axis of said controller device.

25. The controller device of claim 24 wherein said main terminals and/or said communication terminal are symmetrically located about said rotational axis.

26. The controller device of claim 22 wherein said communication terminal comprises a TRS type connector.

27. The controller device of claim 26 wherein disposed around said TRS type connector is an electrically conductive ring shaped portion, or at least one electrically conductive arcuate portion, forming at least a part of a second reference ring, wherein said TRS type connector and said second reference ring are concentric to each other.

28. The controller device of claim 14 comprising electronic circuitry including a signaling electrical component that selectively provides a signaling control value along said communication terminal.

29. The controller device of claim 28 wherein said control value is a 0-10V signal or a DALI signal.

30. The controller device of claim 29 wherein said signals are dimming signals.

31. The controller device of claim 28 wherein said electronic circuitry includes a photosensor in electrical communication with said signaling electrical component.

32. The controller device of claim 31 wherein said photosensor is in electrical communication with one of said main terminals.

33. A controller device comprising:
a housing and an electrically insulating base secured to said housing;
at least one printed circuit board secured to said base in an interior of said housing;
communication circuitry for sending signals disposed on said at least one printed circuit board;
a communication terminal secured in electrical contact with said communication circuitry on said at least one printed circuit board; wherein said communication terminal has a circular and/or ring shape; and
main electrically conductive terminals secured in electrical contact with said at least one printed circuit board, wherein said main terminals are each arcuate and L- or P-shaped, said main terminals being spaced around said communication terminal.

34. The controller device of claim 33 wherein said communication terminal comprises a centrally located pin and a surrounding ring member.

35. The controller device of claim 33 wherein said printed circuit board includes circuitry that responds to changes in ambient light or detection of an object.

36. The controller device of claim 33 wherein said main terminals are receivable in main terminal channels of a second electrical device and said controller device and said second electrical device are twisted relative to each other to lock said main terminals into electrical contact with main connectors aligned with said main terminal channels of said second electrical device, and said central communication terminal electrically contacts a communication connector of said second electrical device throughout said twisting.

37. An electrical device comprising:
a housing and an electrically insulating base secured to said housing;
a communication terminal that protrudes from said base; and
electrically conductive arcuate main terminals protruding from said base and spaced apart from each other and from said communication terminal;
wherein said main terminals are receivable in main terminal channels of a second electrical device and said electrical device and said second electrical device are twisted relative to each other to lock said main terminals into electrical contact with main connectors aligned with said main terminal channels of said second electrical device, and said communication terminal contacts a communication connector of said second electrical device throughout said twisting.

* * * * *